US011089001B2

(12) United States Patent
     Choi

(10) Patent No.: US 11,089,001 B2
(45) Date of Patent: Aug. 10, 2021

(54) ELECTRONIC APPARATUS AND OPERATION METHOD THEREOF

(71) Applicant: Samsung Electronics Co., Ltd., Gyeonggi-do (KR)

(72) Inventor: Seung-Min Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 239 days.

(21) Appl. No.: 16/083,732

(22) PCT Filed: Feb. 27, 2017

(86) PCT No.: PCT/KR2017/002132
    § 371 (c)(1),
    (2) Date: Sep. 10, 2018

(87) PCT Pub. No.: WO2017/155235
    PCT Pub. Date: Sep. 14, 2017

(65) Prior Publication Data
    US 2019/0075092 A1    Mar. 7, 2019

(30) Foreign Application Priority Data

Mar. 8, 2016 (KR) .................. 10-2016-0027909

(51) Int. Cl.
    *H04L 29/06*         (2006.01)
    *H04L 9/08*          (2006.01)
            (Continued)

(52) U.S. Cl.
    CPC ........ *H04L 63/062* (2013.01); *G06F 21/6209* (2013.01); *G06F 21/6218* (2013.01);
            (Continued)

(58) Field of Classification Search
    CPC . H04L 63/062; H04L 63/0478; H04L 63/061; H04L 63/107; H04L 63/0876;
            (Continued)

(56) References Cited

U.S. PATENT DOCUMENTS

| 2006/0010323 | A1* | 1/2006 | Martin ................. H04L 63/101 |
|  |  |  | 713/171 |
| 2008/0184334 | A1 | 7/2008 | Hebert et al. |
| 2009/0202069 | A1 | 8/2009 | Cox et al. |
| 2012/0110327 | A1 | 5/2012 | Doerner et al. |
| 2013/0340093 | A1 | 12/2013 | Reinertsen |

(Continued)

FOREIGN PATENT DOCUMENTS

| KR | 1020110104738 | 9/2011 |
| KR | 1020130085568 | 7/2013 |
| KR | 1020150128202 | 11/2015 |

OTHER PUBLICATIONS

PCT/ISA/210 Search Report issued on PCT/KR2017/002132 (pp. 3).

(Continued)

*Primary Examiner* — Ashokkumar B Patel
*Assistant Examiner* — William B Jones
(74) *Attorney, Agent, or Firm* — The Farrell Law Firm, P.C.

(57) ABSTRACT

A method for operating an electronic apparatus according to an embodiment of the present invention may comprise the steps of: setting a first key for unlocking data stored in a first electronic apparatus; when the first electronic apparatus receives, from a second electronic apparatus, a second key set by the second electronic apparatus, transmitting by the first electronic apparatus, to the second electronic apparatus, first data locked using the first key and the second key; and when the first electronic apparatus receives, from the second electronic apparatus, a generation signal of a first event for the first data, transmitting the first key to the second electronic apparatus according to whether the first event is approved or not.

13 Claims, 18 Drawing Sheets

(51) Int. Cl.
*G06F 21/62* (2013.01)
*H04L 9/12* (2006.01)
*H04L 29/08* (2006.01)

(52) U.S. Cl.
CPC .............. *H04L 9/0819* (2013.01); *H04L 9/12* (2013.01); *H04L 63/0478* (2013.01); *H04L 63/061* (2013.01); *H04L 63/0876* (2013.01); *H04L 63/107* (2013.01); *H04L 63/108* (2013.01); *H04L 67/06* (2013.01)

(58) Field of Classification Search
CPC ....... H04L 63/108; H04L 9/0819; H04L 9/12; H04L 67/06; G06F 21/6209; G06F 21/6218
See application file for complete search history.

(56) References Cited

U.S. PATENT DOCUMENTS

| | | |
|---|---|---|
| 2014/0052985 A1 | 2/2014 | Yang |
| 2015/0195254 A1 | 7/2015 | Stiglic et al. |
| 2015/0324605 A1* | 11/2015 | Yoon .................... G06F 21/6245 726/28 |
| 2018/0302786 A1* | 10/2018 | Yu ......................... G06F 21/316 |

OTHER PUBLICATIONS

PCT/ISA/237 Written Opinion issued on PCT/KR2017/002132 (pp. 6).
European Search Report dated Jan. 18, 2019 issued in counterpart application No. 17763497.9-1218, 8 pages.

\* cited by examiner

ELECTRONIC APPARATUS AND OPERATION METHOD THEREOF

PRIORITY

This application is a National Phase Entry of PCT International Application No. PCT/KR2017/002132, which was filed on Feb. 27, 2017, and claims priority to Korean Patent Application No. 10-2016-0027909, which was filed on Mar. 8, 2016, the contents of each which are incorporated herein by reference.

FIELD

The present disclosure relates generally to an electronic device for performing a multi-locking function and a method of operating the same.

DESCRIPTION OF RELATED ART

Recently, communication technology has been developed and portable terminals that include smart functions have been distributed, so that users can transmit/receive or share data through these portable terminals.

A data security method using authentication information to share the data with particular users, when data is transmitted/received or shared, is proposed.

The conventional data security method is performed such that a transmission side or a reception side of data simply inputs authentication information. However, as data sharing or transmission/reception becomes more frequent due to the development of communication technology and distribution of portable terminals including smart functions, a security method through multi-authentication is also proposed.

The conventional security method through multi-authentication carries a risk of exposure. Further, in the conventional security method that uses multi-authentication, when the authentication method is exposed, the data security may be disabled without the consent of interested members.

SUMMARY

The technical problem to be solved by the present disclosure is to provide an electronic device and a method of operating the same in which each of a plurality of electronic devices configures authentication information and locks and unlocks data through each piece of the configured authentication information.

A method of operating an electronic device according to an embodiment of the present disclosure includes: configuring a first key for unlocking data stored in a first electronic device; when the first electronic device receives a second key configured by a second electronic device from the second electronic device, transmitting locked first data to the second electronic device through the first key and the second key by the first electronic device; and when the first electronic device receives a generation signal of a first event for the first data from the second electronic device, transmitting the first key to the second electronic device according to whether the first event is approved.

An electronic device, according to an embodiment of the present disclosure, includes: a memory; a communication module; and a processor, wherein the processor configures a first key by unlocking data stored in the memory, transmitting, when a second key configured by a second electronic device is received from the second electronic device through the communication module, locked first data to the second electronic device through the first key and the second key, and transmitting, when a generation signal of a first event for the first data is received from the second electronic device through the communication module, the first key to the second electronic device according to whether the first event is approved.

An electronic device, according to an embodiment of the present disclosure, has an effect of preventing authentication information or security data from being leaked because each of a plurality of electronic devices configures authentication information and locks and unlocks data through each piece of the configured authentication information.

BRIEF DESCRIPTION OF DRAWINGS

The above and other aspects, features, and advantages of the present disclosure will be more apparent from the following detailed description taken in conjunction with the accompanying drawings, in which.

DETAILED DESCRIPTION

Figure 1:
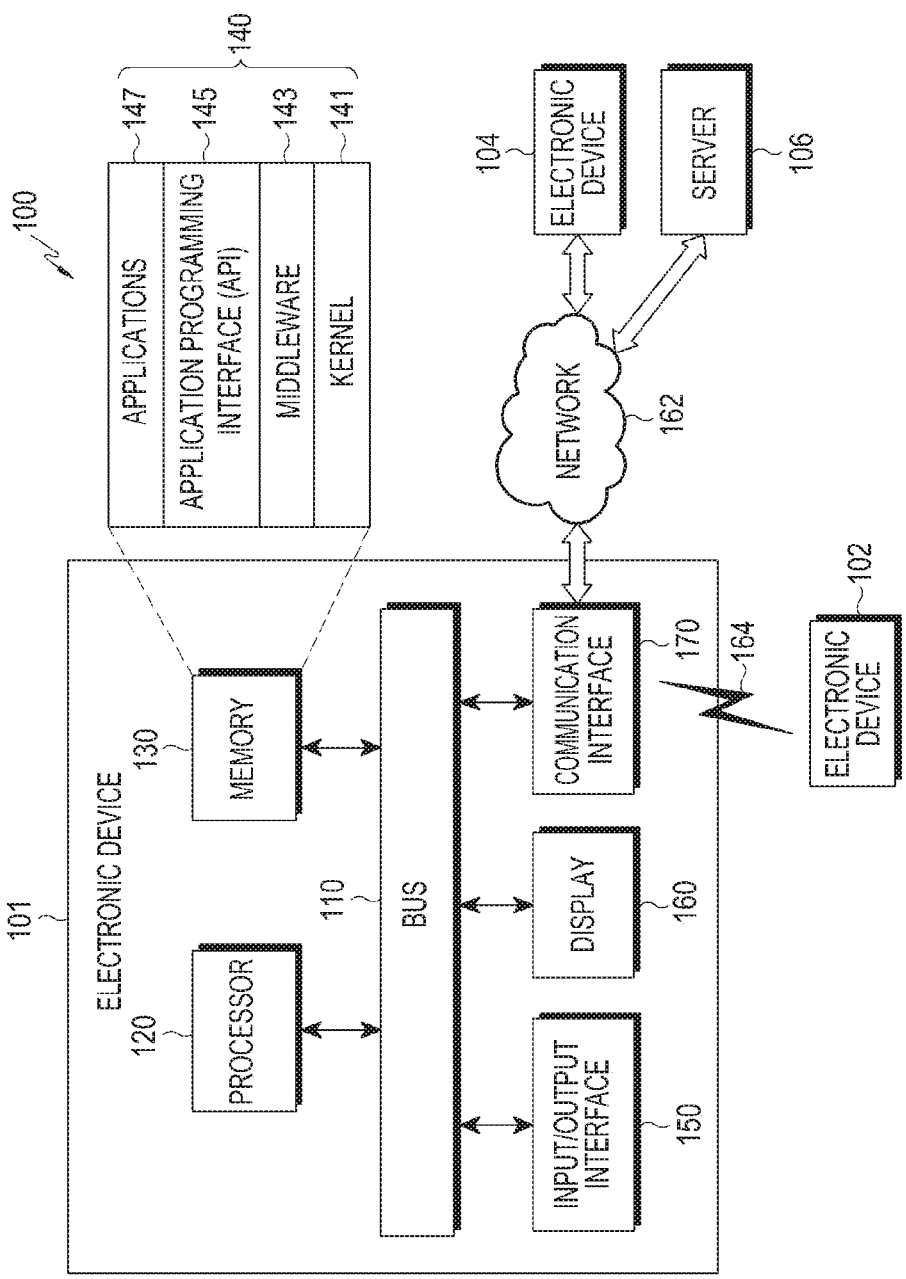
FIG. 1 is a block diagram illustrating an electronic device and a network according to various embodiments of the present disclosure.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, singular forms may include plural forms as well unless the context clearly indicates otherwise. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MM), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be flexible, or may be a combination of one or more of the aforementioned various devices. The electronic device according to one embodiment of the present disclosure is not limited to the above described devices. In the present disclosure, the term "user" may indicate a person using an electronic device or a device (e.g., an artificial intelligence electronic device) using an electronic device.

An electronic device 101 in a network environment 100 according to various embodiments will be described with reference to FIG. 1. The electronic device 101 may include a bus 110, a processor 120, a memory 130, an input/output interface 150, a display 160, and a communication interface 170. In some embodiments, the electronic device 101 may omit at least one of the above elements or may further include other elements. The bus 110 may include, for example, a circuit that interconnects the elements 110 to 170 and transmits communication (for example, control messages or data) between the elements. The processor 120 may include one or more of a central processing unit, an application processor, and a communication processor (CP). The processor 120, for example, may carry out operations or data processing relating to the control and/or communication of at least one other element of the electronic device 101.

The memory 130 may include volatile and/or non-volatile memory. The memory 130 may store, for example, instructions or data relevant to at least one other element of the electronic device 101. According to an embodiment, the memory 130 may store software and/or a program 140. The program 140 may include a kernel 141, middleware 143, an Application Programming Interface (API) 145, and/or application programs (or "applications") 147. At least some of the kernel 141, the middleware 143, and the API 145 may be referred to as an operating system. The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data. Furthermore, the middleware 143 may process one or more task requests, which are received from the application programs 147, according to priorities thereof. For example, the middleware 143 may assign priorities for using the system resources (for example, the bus 110, the processor 120, the memory 130, or the like) of the electronic device 101 to one or more of the application programs 147, and may process the one or more task requests. The API 145 is an interface through which the applications 147 control functions provided from the kernel 141 or the middleware 143, and may include, for example, at least one interface or function (for example, instruction) for file control, window control, image processing, or text control. For example, the input/output interface 150 may forward instructions or data, input from a user or an external device, to the other element(s) of the electronic device 101, or may output instructions or data, received from the other element(s) of the electronic device 101, to the user or the external device.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160 may display, for example, various types of content (for example, text, images, videos, icons, and/or symbols) for a user. The display 160 may include a touch screen and may receive, for example, a touch, gesture, proximity, or hovering input using an electronic pen or the user's body part. The communication interface 170, for example, may set communication between the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may include, for example, a cellular communication that uses at least one of LTE, LTE-Advance (LTE-A), code division multiple access (CDMA), wideband CDMA (WCDMA), universal mobile telecommunications system (UMTS), wireless broadband (WiBro), global system for mobile communications (GSM), or the like. According to an embodiment, the wireless communication may include, for example, at least one of Wi-Fi, Bluetooth, Bluetooth low energy (BLE), ZigBee, near field communication (NFC), magnetic secure transmission, Radio Frequency (RF), and body area network (BAN). According to an embodiment, the wireless communication may include a GNSS. The GNSS may be, for example, a global positioning system (GPS), a global navigation satellite system (Glonass), a Beidou navigation satellite system (hereinafter, referred to as "Beidou"), or Galileo (the European global satellite-based navigation system). Hereinafter, in this document, the term "GPS" may be interchangeable with the term "GNSS". The wired communication may include, for example, at least one of a Universal Serial Bus (USB), a High Definition Multimedia Interface (HDMI), Recommended Standard 232 (RS-232), a Plain Old Telephone Service (POTS), and the like. The network 162 may include a telecommunications network, for example, at least one of a computer network (for example, a LAN or a WAN), the Internet, and a telephone network.

Each of the first and second external electronic devices 102 and 104 may be of a type identical to or different from that of the electronic device 101. According to various embodiments, all or some of the operations executed by the electronic device 101 may be executed by another electronic device, a plurality of electronic devices (for example, the electronic devices 102 and 104), or the server 106. According to an embodiment, when the electronic device 101 has to perform a function or service automatically or in response to a request, the electronic device 101 may request another device (for example, the electronic device 102 or 104, or the server 106) to perform at least some functions relating thereto, instead of autonomously or additionally performing the function or service. Another electronic apparatus may execute the requested functions or the additional functions, and may deliver a result of the execution to the electronic apparatus 101. The electronic device 101 may provide the received result as it is, or may additionally process the received result to provide the requested functions or services. To this end, for example, cloud computing, distributed computing, or client-server computing technology may be used.

Figure 2:
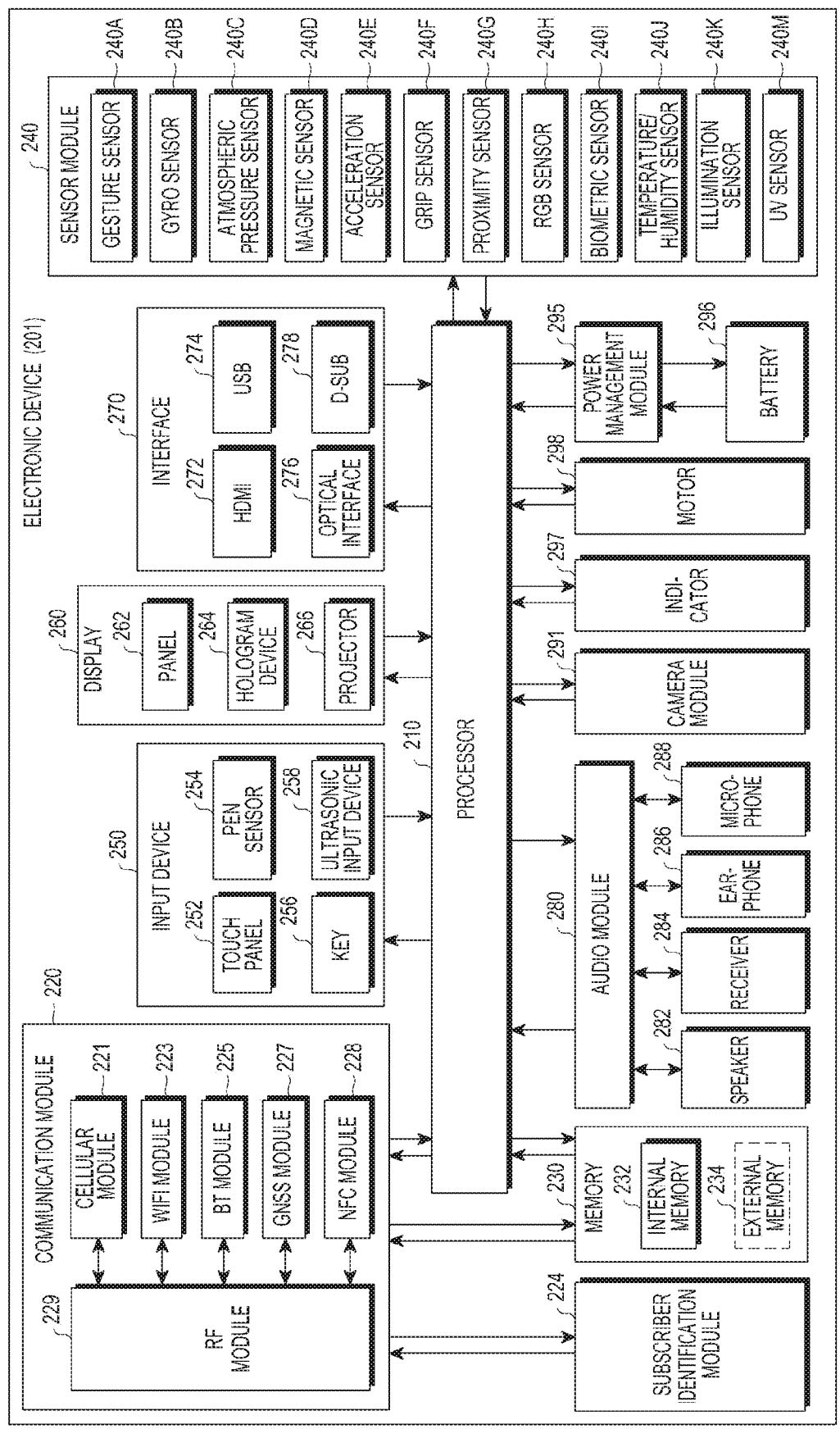
FIG. 2 is a block diagram of the electronic device according to various embodiments.

FIG. 2 is a block diagram illustrating an electronic device 201 according to various embodiments. The electronic device 201 may include, for example, the whole or part of the electronic device 101 illustrated in FIG. 1. The electronic device 201 may include at least one processor 210 (for example, an AP), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. The processor 210 may control a plurality of hardware or software elements connected to the processor 210 by running, for example, an Operating System (OS) or an application program, and may perform processing and arithmetic operations of various types of data. The processor 210 may be implemented by, for example, a System on Chip (SoC). According to an embodiment, the processor 210 may further include a graphic processing unit (GPU) and/or an image signal processor. The processor 210 may also include at least some of the elements illustrated in FIG. 2 (for example, a cellular module 221). The processor 210 may load, in a volatile memory, instructions or data received from at least one of the other elements (for example, a non-volatile memory), process the loaded instructions or data, and store the result data in the non-volatile memory.

The communication module 220 may have a configuration identical or similar to that of the communication interface 170 illustrated in FIG. 1. The communication module 220 may include, for example, a cellular module 221, a Wi-Fi module 223, a Bluetooth module 225, a GNSS module 227, an NFC module 228, and an RF module 229. The cellular module 221 may provide, for example, a voice call, a video call, a text message service, an Internet service, or the like through a communication network. According to an embodiment of the present disclosure, the cellular module 221 may identify or authenticate an electronic device 201 in the communication network using a subscriber identification module (for example, a Subscriber Identity Module (SIM) card) 224. According to an embodiment, the cellular module 221 may perform at least some of the functions that the AP 210 may provide. According to an embodiment, the cellular module 221 may include a communication processor (CP). In some embodiments, at least some (two or more) of the cellular module 221, the Wi-Fi module 223, the Bluetooth module 225, the GNSS module 227, and the NFC module 228 may be included in a single Integrated Chip (IC) or IC package. The RF module 229 may transmit/receive, for example, a communication signal (for example, an RF signal). The RF module 229 may include, for example, a transceiver, a power amp module (PAM), a frequency filter, a low noise amplifier (LNA), an antenna, or the like. According to another embodiment, at least one of the cellular module 221, the Wi-Fi module 223, the BT module 225, the GPS module 227, and the NFC module 228 may transmit/receive an RF signal through a separate RF module. The subscriber identification module 224 may include, for example, a card that includes a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The internal memory 232 may include, for example, at least one of a volatile memory (for example, a DRAM, an SRAM, an SDRAM, or the like) and a non-volatile memory (for example, a One Time Programmable ROM (OTPROM), a PROM, an EPROM, an EEPROM, a mask ROM, a flash ROM, a flash memory, a hard disk drive, or a Solid State Drive (SSD)). The external memory 234 may include a flash drive, for example, a compact flash (CF), a secure digital (SD), a Micro-SD, a Mini-SD, an eXtreme digital (xD), a multi-media card (MMC), a memory stick, and the like. The external memory 234 may be functionally and/or physically connected to the electronic device 201 through various interfaces.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, an illumination sensor 240K, and a ultraviolet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor, which is configured to control the sensor module 240, as a part of the processor 210 or separately from the processor 210 in order to control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user. The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (for example, a microphone 288) to identify data corresponding to the detected ultrasonic waves.

The display 260 (for example, the display 160) may include a panel 262, a hologram device 264, a projector 266, and/or a control circuit for controlling them. The panel 262 may be implemented to be, for example, flexible, transparent, or wearable. The panel 262, together with the touch panel 252, may be configured as one or more modules. According to an embodiment, the panel 262 may include a pressure sensor (or a POS sensor) which may measure a strength of pressure of a user's touch. The pressure sensor may be implemented so as to be integrated with the touch panel 252 or may be implemented as one or more sensors separate from the touch panel 252. The hologram device 264 may show a three dimensional image in the air by using an interference of light. The projector 266 may display an image by projecting light onto a screen. The screen may be located, for example, in the interior of, or on the exterior of, the electronic device 201. The interface 270 may include, for example, an HDMI 272, a USB 274, an optical interface 276, or a D-subminiature (D-sub) 278. The interface 270 may be included in, for example, the communication circuit 170 illustrated in FIG. 1. Additionally or alternatively, the interface 270 may, for example, include a mobile high-definition link (MHL) interface, a secure digital (SD) card/multi-media card (MMC) interface, or an infrared data association (IrDA) standard interface.

The audio module 280 may bi-directionally convert, for example, a sound and an electric signal. At least some elements of the audio module 280 may be included, for example, in the input/output interface 150 illustrated in FIG. 1. The audio module 280 may process sound information that is input or output through, for example, a speaker 282, a receiver 284, earphones 286, the microphone 288, and the like. The camera module 291 is a device that can photograph a still image and a moving image. According to an embodiment, the camera module 291 may include one or more image sensors (for example, a front sensor or a rear sensor), a lens, an image signal processor (ISP), or a flash (for example, an LED or xenon lamp). The power management module 295 may manage, for example, the power of the electronic device 201. According to an embodiment, the power management module 295 may include a power management integrated circuit (PMIC), a charger IC, or a battery or fuel gauge. The PMIC may use a wired and/or wireless charging method. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, the residual amount of the battery 296 and a voltage, current, or temperature while charging. The battery 296 may include, for example, a rechargeable battery and/or a solar battery.

The indicator 297 may display a particular state, for example, a booting state, a message state, a charging state, or the like of the electronic device 201 or a part (for example, the processor 210) of the electronic device 201. The motor 298 may convert an electrical signal into a mechanical vibration and may generate a vibration, a haptic effect, or the like. The electronic device 201 may include a mobile TV support device that can process media data according to a standard, such as digital multimedia broadcasting (DMB), digital video broadcasting (DVB), media-Flo™, and the like. Each of the above-described component elements of hardware according to the present disclosure may be configured with one or more components, and the names of the corresponding component elements may vary based on the type of electronic device. According to various embodiments, the electronic device (for example, the electronic device 201) may not include some elements or may further include additional elements. Some of elements are coupled to constitute one object but the electronic device may perform the same functions as those which the corresponding elements have before being coupled to each other.

Figure 3:
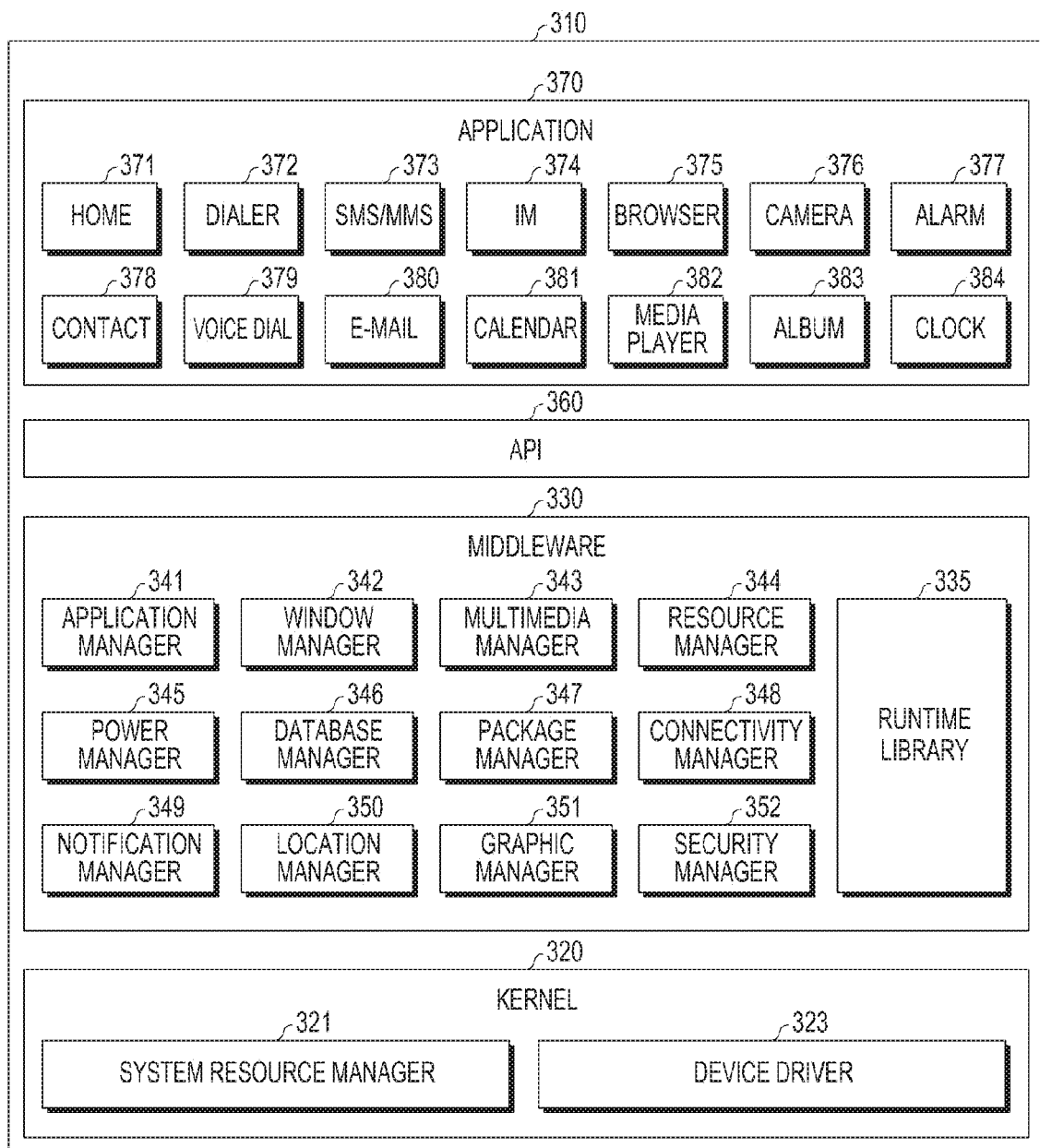
FIG. 3 is a block diagram of a program module according to various embodiments.

FIG. 3 is a block diagram of a program module according to various embodiments. According to an embodiment, the program module 310 (for example, the program 140) may include an Operating System (OS) for controlling resources related to the electronic device (for example, the electronic device 101) and/or various applications (for example, the application programs 147) executed in the operating system. The operating system may include, for example, Android™, iOS™, Windows™, Symbian™, Tizen™, or Bada™. Referring to FIG. 3, the program module 310 may include a kernel 320 (for example, the kernel 141), middleware 330 (for example, the middleware 143), an API 360 (for example, the API 145), and/or applications 370 (for example, the application programs 147). At least some of the program module 310 may be preloaded on the electronic device, or may be downloaded from an external electronic device (for example, the electronic device 102 or 104, or the server 106).

The kernel 320 may include, for example, a system resource manager 321 and/or a device driver 323. The system resource manager 321 may control, allocate, or retrieve system resources. According to an exemplary embodiment of the present disclosure, the system resource manager 321 may include a process manager, a memory manager, a file system manager, or the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver. The middleware 330 may provide, for example, a function required by the applications 370 in common, or may provide various functions to the applications 370 through the API 360 such that the applications 370 can efficiently use limited system resources within the electronic device. According to an embodiment, the middleware 330 may include at least one of a runtime library 335, an application manager 341, a window manager 342, a multi-media manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may manage an input/output, manage a memory, or process an arithmetic function. The application manager 341 may manage, for example, the life cycles of the applications 370. The window manager 342 may manage GUI resources used for a screen. The multimedia manager 343 may identify formats required for reproducing various media files and may encode or decode a media file using a codec suitable for the corresponding format. The resource manager 344 may manage the source code of the applications 370 or the space in memory. The power manager 345 may manage, for example, the capacity or power of a battery and may provide power information required for operating the electronic device. According to an embodiment, the power manager 345 may operate in conjunction with a Basic Input/Output System (BIOS). The database manager 346 may, for example, generate, search, or change databases to be used by the applications 370. The package manager 347 may manage the installation or update of an application that is distributed in the form of a package file.

The connectivity manager 348 may manage, for example, a wireless connection. The notification manager 349 may provide information on an event (for example, an arrival message, an appointment, a proximity notification, or the like) to a user. The location manager 350 may manage, for example, the location information of the electronic device. The graphic manager 351 may manage a graphic effect to be provided to a user and a user interface relating to the graphic effect. The security manager 352 may provide, for example, system security or user authentication. According to an embodiment, the middleware 330 may include a telephony manager for managing a voice or video call function of the electronic device or a middleware module that is capable of forming a combination of the functions of the above-described elements. According to an embodiment, the middleware 330 may provide a module specified for each type of the OS. Furthermore, the middleware 330 may dynamically remove some of the existing elements, or may add new elements. The API 360 is, for example, a set of API programming functions, and may be provided with different configurations according to operating systems. For example, in the case of Android or iOS, one API set may be provided for each platform, and in the case of Tizen, two or more API sets may be provided for each platform.

The applications 370 may include, for example, a home application 371, a dialer application 372, an SMS/MMS application 373, an instant messaging (IM) application 374, a browser application 375, a camera application 376, an alarm application 377, a contact application 378, a voice dial application 379, an email application 380, a calendar application 381, a media player application 382, an album application 383, a watch application 384, a health-care application (for example, for measuring exercise quantity or blood glucose), or an application providing environmental information (for example, atmospheric pressure, humidity, or temperature information). According to an embodiment, the applications 370 may include an information exchange application that can support the exchange of information between the electronic device and an external electronic device. The information exchange application may include, for example, a notification relay application for relaying particular information to an external electronic device or a device management application for managing an external electronic device. For example, the notification relay application may relay notification information generated in the other applications of the electronic device to an external electronic device, or may receive notification information from an external electronic device to provide the received notification information to a user. The device management application may install, delete, or update the functions (for example, turning on/off the external electronic device itself (or some elements thereof) or adjusting the brightness (or resolution) of a display) of an external electronic device that communicates with the electronic device or applications executed in the external electronic device. According to an embodiment, the applications 370 may include applications (for example, a health care application of a mobile medical appliance) that are designated according to the attributes of an external electronic device. According to an embodiment, the applications 370 may include applications received from an external electronic device. At least some of the program module 310 may be implemented (for example, executed) by software, firmware, hardware (for example, the processor 210), or a combination of two or more thereof and may include a module, a program, a routine, an instruction set, or a process for performing one or more functions.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (for example, a magnetic tape), an Optical Media (for example, CD-ROM, DVD), a Magneto-Optical Media (for example, a floptical disk), an inner memory, and the like. The instruction may include a code made by a complier or a code that can be executed by an interpreter. The programming module according to the present disclosure may include one or more of the aforementioned elements or may further include other additional elements, or some of the aforementioned elements may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

Figure 4:
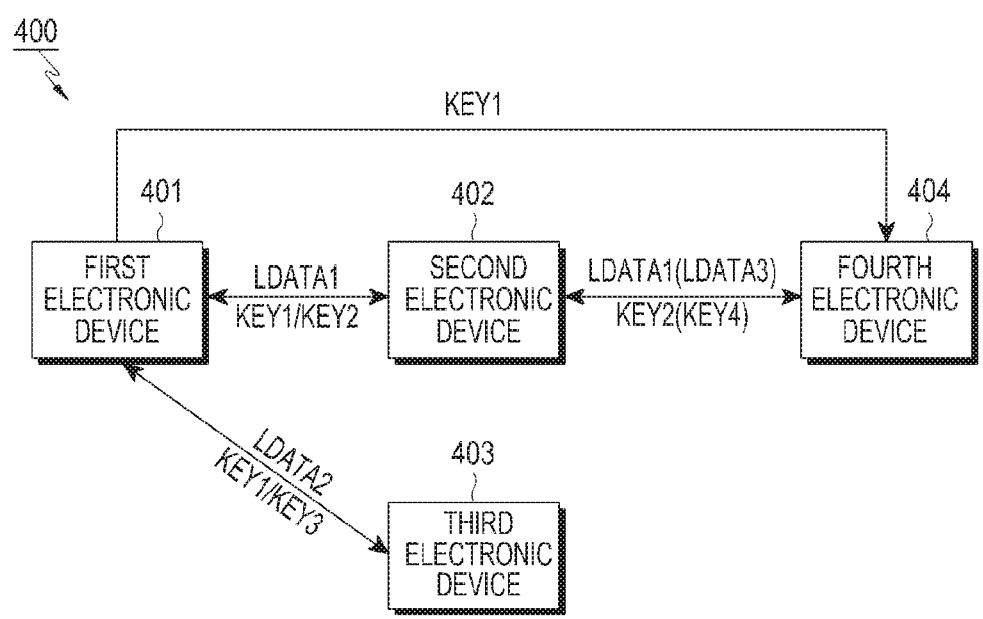
FIG. 4 is a schematic block diagram illustrating an electronic system according to an embodiment of the present disclosure.

FIG. 4 is a schematic block diagram illustrating an electronic system according to an embodiment of the present disclosure.

Referring to FIG. 4, an electronic system 400 may include a first electronic device 401, a second electronic device 402, a third electronic device 403, and a fourth electronic device 404.

The electronic system 400 may be a system in which a plurality of electronic devices 401, 402, 403, and 404 transmit or share data therewith by locking data through a unique authentication method thereof and unlocking the locked data through a unique authentication method thereof.

For convenience of description, hereinafter, it is assumed and described that the first electronic device 401 is an electronic device on a transmission side that transmits data. However, the technical idea of the present disclosure is not limited thereto, and each of the plurality of electronic devices 401, 402, 403, and 404 included in the electronic system 400 may be implemented as an electronic device that transmits and receives data.

Each of the plurality of electronic devices 401, 402, 403, and 404 may be implemented to be substantially the same as or similar to the electronic device 101 described in FIG. 1.

The first electronic device 401 may share data with configured electronic devices. At this time, the first electronic device 401 may perform a multi-locking function on electronic devices with which to share data. The multi-locking function may refer to a function or an operation in which the first electronic device 401, in order to share data with electronic devices transmitting unique authentication keys, locks the data through a plurality of keys received from other electronic devices and shares the locked data. Further, the multi-locking function may refer to a function or an operation in which the first electronic device 401 unlocks the locked data through a plurality of keys received from other electronic devices and the authentication information of the first electronic device 401.

According to an embodiment, the first electronic device 401 may share data with the second electronic device 402. Further, the first electronic device 401 may share data with the third electronic device 403. At this time, the data may be information, files, or data generated by or stored in the first electronic device 401. For convenience of description, hereinafter, the data may be data which the first electronic device 401 shares with other electronic devices.

Hereinafter, information on unique authentication means that the plurality of electronic devices 401, 402, 403, and 404 may be configured as a first key (KEY1), a second key (KEY2), a third key (KEY3), and a fourth key (KEY4), respectively.

For example, the first key (KEY1) may refer to authentication information configured by the first electronic device 401. Further, when authentication information configured by the first electronic device 401 matches authentication information input by the user, the first key (KEY1) may refer to approval information of an event occurring in another electronic device 402, 403, or 404.

Similarly, the second key (KEY2) may refer to authentication information configured by the second electronic device 402 or, when authentication information configured by the second electronic device 402 matches authentication information input by the user, may refer to approval information of an event occurring in the second electronic device 402. The third key (KEY3) may refer to authentication information configured by the third electronic device 403 or, when authentication information configured by the third electronic device 403 matches authentication information input by the user, may refer to approval information of an event occurring in the third electronic device 403. The fourth key (KEY4) may refer to authentication information configured by the fourth electronic device 404 or, when authentication information configured by the fourth electronic device 404 matches authentication information input by the user, may refer to approval information of an event occurring in the fourth electronic device 404.

The event may be an operation or a state of unlocking, executing, opening, storing, re-reading, modifying, or re-transmitting data. For convenience of description, hereinafter, a first event may be an event occurring in the second electronic device 402, a second event may be an event occurring in the third electronic device 403, and a fourth event may be an event occurring in the fourth electronic device 404.

For example, each of the first key (KEY1), the second key (KEY2), the third key (KEY3), and the fourth key (KEY4) may be implemented using a fingerprint, a gesture, a password, a passcode, or a pattern.

According to an embodiment, the first electronic device 401 may configure the first key (KEY1) for shared data. At this time, the first electronic device 401 may determine whether a multi-locking function is performed on shared data.

For example, when the multi-locking function is performed, the first electronic device 401 may receive the second key (KEY2) from the second electronic device 402. At this time, the first electronic device 401 may make a request for transmitting the second key (KEY2) to the second electronic device 402.

The first electronic device 401 may change the state of the data to a locked state through the first key (KEY1) and the second key (KEY2). For example, the first electronic device 401 may generate locked first data (LDATA1) that is in the locked state through a first key (KEY1) and the second key (KEY2).

The first data (LDATA1) may be locked data that first electronic device 401 generates using the first key (KEY1) and the second key (KEY2). At this time, the first data (LDATA1) may include information on the first key (KEY1) and the second key (KEY2) in the data (for example, a data header or a data field).

The first electronic device 401 may transmit (or share) the locked first data (LDATA1) to the second electronic device 402. That is, when the second key (KEY2) is transmitted from the second electronic device 402, the first electronic device 401 may transmit the first data (LDATA1).

The first electronic device 401 may share data with the third electronic device 403.

For example, when the multi-locking function is performed, the first electronic device 401 may receive the third key (KEY3) from the third electronic device 403. At this time, the first electronic device 401 may make a request for transmitting the third key (KEY3) to the third electronic device 403.

The first electronic device 401 may change the state of the data to the locked state through the first key (KEY1) and the third key (KEY3). For example, the first electronic device 401 may generate locked second data (LDATA2) that is in a locked state through the first key (KEY1) and the third key (KEY3).

The second data (LDATA2) may be locked data which the first electronic device 401 generates using the first key (KEY1) and the third key (KEY3). At this time, the second data (LDATA2) may include information on the first key (KEY1) and the third key (KEY3) in data (for example, a data header or a data field).

The first electronic device 401 may transmit (or share) the locked second data (LDATA2) to the third electronic device 403. That is, when the third key (KEY3) is transmitted from the third electronic device 403, the first electronic device 401 may transmit the second data (LDATA2).

Meanwhile, in response to a generation signal of the event received from the fourth electronic device 404, the first electronic device 401 may transmit the first key (KEY1) to the fourth electronic device 404.

The second electronic device 402 may transmit the second key (KEY2) to the first electronic device 401. Further, the second electronic device 402 may receive the locked first data (LDATA1) from the first electronic device 401.

According to an embodiment, the second electronic device 402 may unlock the first data (LDATA1). For example, when the second electronic device 402 unlocks the first data (LDATA1), the second electronic device 402 may transmit a generation signal of the event for the first data (LDATA1) to the first electronic device 401. At this time, the event may be an operation or a state of unlocking the first data (LDATA1). For example, the event may be an operation or a state of unlocking, executing, opening, storing, re-reading, modifying, or re-transmitting the first data (LDATA1).

The second electronic device 402 may receive the first key (KEY1) from the first electronic device 401 and unlock the first data (LDATA1) through the received first key and the unique authentication means (for example, the second key (KEY2)) of the second electronic device 402. Further, the second electronic device 402 may execute the event for the first data (LDATA1) through the first key (KEY1) and the second key (KEY2).

The third electronic device 403 may transmit the third key (KEY3) to the first electronic device 401. Further, the third electronic device 403 may receive the locked second data (LDATA2) from the first electronic device 401.

According to an embodiment, the third electronic device 403 may unlock the second data (LDATA2). For example, when the third electronic device 403 unlocks the second data (LDATA2), the third electronic device 403 may transmit a generation signal of the event for the second data (LDATA2) to the first electronic device 401. At this time, the event may be an operation or a state of unlocking the second data (LDATA2). For example, the event may be an operation or a state of unlocking, executing, opening, storing, re-reading, modifying, or re-transmitting the second data (LDATA2).

The third electronic device 403 may receive the first key (KEY1) from the first electronic device 401 and unlock the second data (LDAT2) through the received first key and the unique authentication means (for example, the third key (KEY3)) of the third electronic device 403. Further, the third electronic device 403 may execute an event for the second data (LDATA2) through the first key (KEY1) and the third key (KEY3).

The fourth electronic device 404 may receive the first data (LDATA1) from the second electronic device 402. For example, when the event occurring in the second electronic device 402 corresponds to re-transmission of the first data (LDATA1) to the fourth electronic device 404, the second electronic device 402 may transmit the first data (LDATA1) to the fourth electronic device 404 according to whether the first electronic device 401 is approved. Further, the second electronic device 402 may transmit the third data (LDATA3) to the fourth electronic device 404 according to whether the first electronic device 401 is approved. At this time, the third data (LDATA3) may be locked data that the second electronic device 402 generates through the first key (KEY1), the second key (KEY2), and the fourth key (KEY4) received from the fourth electronic device 404. At this time, the third data (LDATA3) may include information on the first key (KEY1, the second key (KEY2), and the third key (KEY3) in the data (for example, a data header or a data field).

In order to execute the event for the first data (LDATA1) received from the second electronic device 402, the fourth electronic device 404 may transmit an event generation signal to the first electronic device 401 and the second electronic device 402.

The fourth electronic device 404 may receive the first key (KEY1) from the first electronic device 401. Further, the fourth electronic device 404 may receive the second key (KEY2) from the second electronic device 402. At this time, the fourth electronic device 404 may unlock the first data (LDATA1) through the first key (KEY1) and the second key (KEY2) and execute the event. Further, the fourth electronic device 404 may unlock the third data (LDATA3) through the first key (KEY1), the second key (KEY2), and a unique authentication means (for example, the fourth key (KEY4) and execute the event.

Although FIG. 4 illustrates the electronic system 400 including the first electronic device 401, the second electronic device 402, the third electronic device 403, and the fourth electronic device 404, the technical idea of the present disclosure is not limited to the number of electronic devices included in the electronic system 400 and the electronic system 400 may include a plurality of electronic devices.

Figure 5:
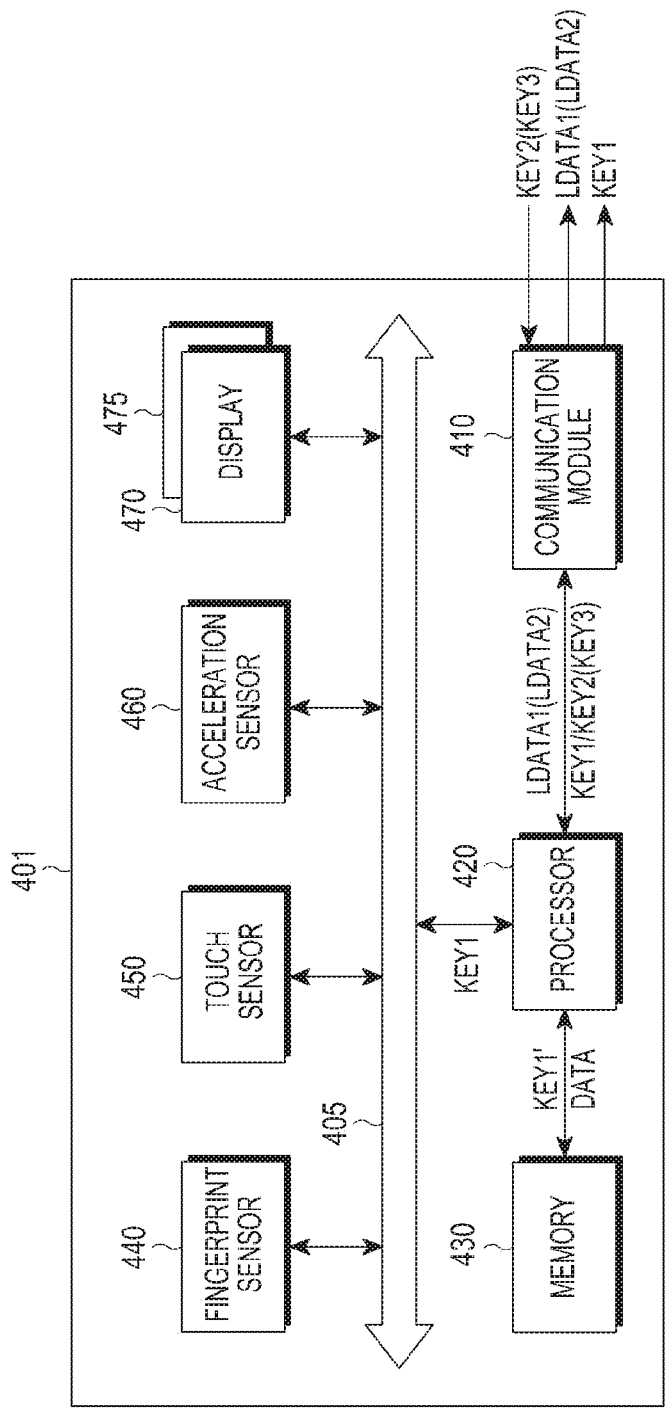
FIG. 5 is a block diagram illustrating the electronic device of FIG. 4.

FIG. 5 is a schematic block diagram illustrating the electronic device of FIG. 4.

Referring to FIGS. 4 and 5, the first electronic device 401 may include a communication module 410, a processor 420, a memory 430, a fingerprint sensor 440, a touch sensor 450, an acceleration sensor 460, and a display 470. Each of the elements 410, 420, 430, 440, 450, 460, and 470 of the first electronic device 401 may transmit and receive data through a bus 405.

The communication module 410 may transmit first data (LDATA1) received from the processor 420 to the second electronic device 402. Further, the communication module 410 may transmit second data (LDATA2) received from the processor 420 to the third electronic device 403.

The communication module 410 may transmit the first key (KEY1) received from the processor 420 to the second electronic device 402, the third electronic device 403, or the fourth electronic device 404.

The communication module 410 may receive the second key (KEY2) from the second electronic device 402 and transmit the second key (KEY2) to the processor 420. Further, the communication module 410 may receive the third key (KEY3) from the third electronic device 403 and transmit the third key (KEY3) to the processor 420.

The communication module 410 may receive a generation signal of the event occurring in the second electronic device 402, the third electronic device 403, or the fourth electronic device 404. The communication module 410 may transmit the generation signal to the processor 420.

The processor 420 may control the overall operation of the first electronic device 401.

According to an embodiment, the processor 420 may determine whether to perform the multi-locking function on data stored in the memory 430. Further, the processor 420 may perform the multi-locking function.

For example, the processor 420 may configure the first key (KEY1) for the data. At this time, for the first key (KEY1), a new key may be configured, or the existing authentication means may be configured.

The processor 420 may receive the second key (KEY2) and the third key (KEY3) (or information on the second key (KEY2) and the third key (KEY3)) through the communication module 410.

The processor 420 may lock data through the first key (KEY1) and the second key (KEY2) and generate first data (LDATA1). Further, the processor 420 may lock data through the first key (KEY1) and the third key (KEY3) and generate second data (LDATA2).

The processor 420 may transmit the first data (LDATA1) to the second electronic device 402 through the communication module 410. Further, the processor 420 may transmit the second data (LDATA2) to the third electronic device 403 through the communication module 410.

In response to a generation signal of the event occurring in the second electronic device 402, the third electronic device 403, or the fourth electronic device 404, the processor 420 may determine whether the event generated in the second electronic device 402, the third electronic device 403, or the fourth electronic device 404 is approved. At this time, the processor 420 may determine whether the event is authenticated using the first key (KEY1).

For example, when the event is approved, the processor 420 may transmit the first key (KEY1) (or information on the first key (KEY1)) to the second electronic device 402, the third electronic device 403, or the fourth electronic device 404 through the communication module 410.

Further, when the event is approved, the processor 420 may not transmit the first key (KEY1) (or information on the first key (KEY1)) to the second electronic device 402, the third electronic device 403, or the fourth electronic device 404 through the communication module 410.

Meanwhile, for example, the processor 420 may determine whether a preset first key (KEY1') matches the first key (KEY1) input by the user. When the first keys match each other based on the result of the determination, the processor 420 may transmit the first key (KEY1) to the second electronic device 402, the third electronic device 403, or the fourth electronic device 404. Further, when the first keys do not match each other based on the result of the determination, the processor 420 may not transmit the first key (KEY1) to the second electronic device 402, the third electronic device 403, or the fourth electronic device 404.

The memory 430 may store data according to a control of the processor 420. Further, the memory 430 may store information on a preset authentication means (for example, the first key (KEY1') in the first electronic device 401. For example, the memory 430 may store the first key (KEY1') preset by the user. Further, the memory 430 may transmit the preset first key (KEY1') to the processor 420.

The fingerprint sensor 440 may detect a user's fingerprint and transmit information on the fingerprint to the processor 420. For example, when the first key (KEY1) is information on the user's fingerprint, the fingerprint sensor 440 may transmit information on the detected first key (KEY1) to the processor.

The touch sensor 450 may detect a user's touch and transmit information on the touch to the processor 420. For example, when the first key (KEY1) is information on a touch or a touch pattern, the touch sensor 450 may transmit information on the first key (KEY1) to the processor.

The acceleration sensor 460 may detect a user's gesture for the first electronic device and transmit information on the gesture to the processor 420. For example, when the first key (KEY1) is a gesture for the first electronic device 401, the acceleration sensor 460 may transmit information on the detected first key (KEY1) to the processor.

Although FIG. 5 separately illustrates the fingerprint sensor 440, the touch sensor 450, and the acceleration sensor 460, a single module including at least one of the finger sensor 440, the touch sensor 450, and the acceleration sensor 460 may be implemented.

The display 470 may display information on sharing (or transmission) of data according to a control of the processor 420. For example, the display 470 may display information on the sharing (or transmission) of data through a User Interface (UI).

According to an embodiment, the display 470 may be implemented by contacting a touch screen 475. The user may input information on the first key (KEY1) through the touch screen 475. For example, when the first key (KEY1) is information on a password or a passcode, the touch screen 475 may transmit information on the first key (KEY1) input by the user to the processor 420.

Figure 6:
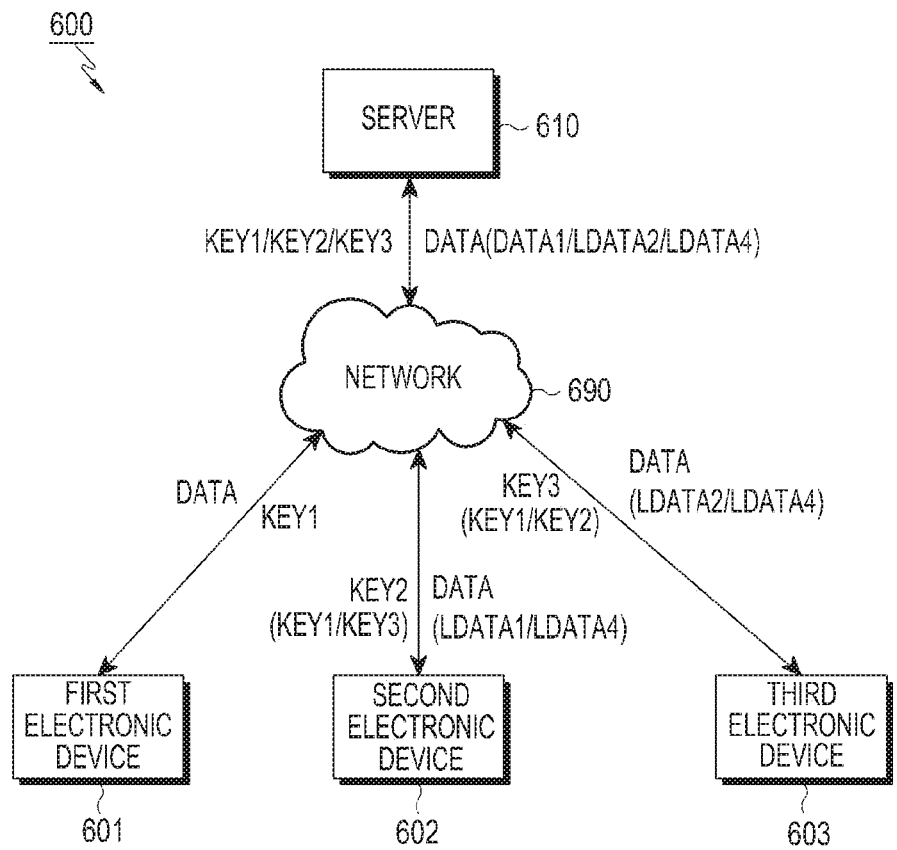
FIG. 6 is a schematic block diagram illustrating an electronic system according to various embodiments of the present disclosure.

FIG. 6 is a schematic block diagram illustrating an electronic system according to various embodiments of the present disclosure.

Referring to FIG. 6, an electronic system 600 may include a first electronic device 601, a second electronic device 602, a third electronic device 603, a server 610, and a network 690.

The electronic system 600 may be implemented to be similar to the electronic system 400 illustrated in FIG. 4 except for the server 610. For example, the electronic system 600 may be a system in which a plurality of electronic devices 601, 602, and 603 transmit or share data therewith through the server 610 by locking data through a unique authentication method thereof through the server 610 and unlocking the locked data through a unique authentication method thereof through the server 610.

For convenience of description, hereinafter, it is assumed and described that the first electronic device 601 is an electronic device on a transmission side that transmits data. However, the technical idea of the present disclosure is not limited thereto, and each of the plurality of electronic devices 601, 602, and 603 included in the electronic system 600 may be implemented as an electronic device that transmits and receives data.

Each of the first electronic device 601, the second electronic device 602, and third electronic device 603 may transmit and receive data to and from the server 610 through a network. For example, the network 690 may be implemented to be substantially the same as or similar to the network 162 illustrated in FIG. 1.

The first electronic device 601 may register in (or subscribe to) the server 610 in order to share data. For example, the first electronic device 601 may transmit the first key (KEY1) to the server 610. That is, the first electronic device 601 may register in (or subscribe to) the server 610 by transmitting the first key (KEY1) to the server 610.

According to an embodiment, the first electronic device 601 may configure the first key (KEY1) through the server 610. For example, the first electronic device 601 may access the server 610 and configure the first key (KEY1) in the state of accessing the server 610. That is, in the state in which the first electronic device 601 accesses the server 610, the user may input authentication information to the first electronic device 601. At this time, the server 610 may receive the user's authentication information input to the first electronic device 601 from the first electronic device 601 and register (or store) the received authentication information.

When the first key (KEY1) is registered in the server 610, the first electronic device 601 may transmit data (DATA) to the server 610 through the network 690 in order to share the data (DATA). At this time, the server 610 may store the data (DATA).

The second electronic device 602 may register in (or subscribe to) the server 610 in order to share the data (DATA) of the first electronic device 601. For example, the second electronic device 602 may transmit the second key (KEY2) to the server 610. That is, the second electronic device 602 may register in (or subscribe to) the server 610 by transmitting the second key (KEY2) to the server 610.

According to an embodiment, the second electronic device 602 may configure the second key (KEY2) through the server 610. For example, the second electronic device 602 may access the server 610 and configure the second key (KEY2) in a state of accessing the server 610. That is, in the state in which the second electronic device 602 accesses the server 610, the user may input authentication information to the second electronic device 602. At this time, the server 610 may receive the user's authentication information input to the second electronic device 602 from the second electronic device 602 and register (or store) the received authentication information.

When the second key (KEY2) is registered in the server 610, the second electronic device 602 may share data (DATA) stored in the server 610.

According to an embodiment, the second electronic device 602 may receive the data (DATA) from the server 610. For example, the second electronic device 602 may transmit a request signal of the data (DATA) to the server 610. When authentication information is input to the second electronic device 602 by the user of the second electronic device 602 in the state in which the second electronic device 602 accesses the server 610, the second electronic device 602 may transmit the input authentication information to the server 610. When approval information (for example, the first key (KEY1)) is transmitted from the first electronic device 601 to the server 610, the second electronic device 602 may receive data (DATA).

According to another embodiment, the second electronic device 602 may receive locked first data (LDATA1) corresponding to the data (DATA) from the server 610. For example, when the second electronic device 602 transmits a request signal of the data (DATA) to the server 610, the server 610 may generate locked first data (LDATA1) corresponding to the data (DATA) through the first key (KEY1) and the second key (KEY2). The server 610 may transmit the first data (LDATA1) to the second electronic device 602.

When an event for the first data (LDATA1) occurs in the second electronic device 602, the second electronic device 602 may transmit a generation signal of the event to the first electronic device 601 through the server 610.

When approval information (for example, the first key (KEY1)) is transmitted from the first electronic device 601 to the server 610, the second electronic device 602 may receive the first key (KEY1) from the server 610. The second electronic device 602 may unlock the first data (LDATA1) through the first key (KEY1) and the second key (KEY2) and execute the event (for example, open the file) for the first data (LDATA1). For example, when the second electronic device 602 receives the first key (KEY1), the user of the second electronic device 602 may input authentication information (for example, the second key (KEY2)) to the second electronic device 602 and execute the event (for example, open the file) for the first data (LDATA1).

The third electronic device 603 may register in (or subscribe to) the server 610 in order to share the data (DATA) of the first electronic device 601. For example, the third electronic device 603 may transmit the third key (KEY3) to the server 610. That is, the third electronic device 603 may register in (or subscribe to) the server 610 by transmitting the third key (KEY3) to the server 610.

According to an embodiment, the third electronic device 603 may configure the third key (KEY3) through the server 610. For example, the third electronic device 603 may access the server 610 and configure the third key (KEY3) in a state of access to the server 610. That is, in the state in which the third electronic device 603 accesses the server 610, the user may input authentication information to the third electronic device 603. At this time, the server 610 may receive the user's authentication information input to the third electronic device 603 from the third electronic device 603 and register (or store) the received authentication information.

When the third key (KEY3) is registered in the server 610, the third electronic device 603 may share data (DATA) stored in the server 610.

According to an embodiment, the third electronic device 603 may receive the data (DATA) from the server 610. For example, the third electronic device 603 may transmit a request signal of the data (DATA) to the server 610. When authentication information is input to the third electronic device 603 by the user of the third electronic device 603 in the state in which the third electronic device 603 accesses the server 610, the third electronic device 603 may transmit the input authentication information to the server 610. When approval information (for example, the first key (KEY1) is transmitted from the first electronic device 601 to the server 610, the third electronic device 603 may receive data (DATA).

According to another embodiment, the third electronic device 603 may receive locked second data (LDATA2) corresponding to the data (DATA) from the server 610. For example, when the third electronic device 603 transmits a request signal of the data (DATA) to the server 610, the server 610 may generate locked second data (LDATA2) corresponding to the data (DATA) through the first key (KEY1) and the third key (KEY3). The server 610 may transmit the second data (LDATA2) to the third electronic device 603.

When an event for the second data (LDATA2) occurs in the third electronic device 603, the third electronic device 603 may transmit a generation signal of the event to the first electronic device 601 through the server 610. When approval information (for example, the first key (KEY1)) is transmitted from the first electronic device 601 to the server 610, the third electronic device 603 may receive the first key (KEY1) from the server 610. The third electronic device 603 may unlock the second data (LDATA2) through the first key (KEY1) and the third key (KEY3) and execute the event (for example, open the file) for the second data (LDATA2). For example, when the third electronic device 603 receives the first key (KEY1), the user of the third electronic device 603 may input authentication information (for example, the third key (KEY3)) to the third electronic device 603 and execute the event (for example, open the file) for the second data (LDATA2).

Further, the second electronic device 602 and the third electronic device 603 may receive locked fourth data (LDATA4) corresponding to the data (DATA) from the server 610. For example, the fourth data (LDATA4) may be locked data corresponding to the data (DATA) which the server 610 generates through the first key (KEY1), the second key (KEY2), and the third key (KEY3).

The second electronic device 602 may unlock the fourth data (LDATA4) through the first key (KEY1), the second key (KEY2), and the third key (KEY3). For example, the second electronic device 602 may receive the first key (KEY1) and the third key (KEY3) from the server 610 and receive the second key (KEY2) from the user of the second electronic device 602. At this time, when approval information (for example, the first key (KEY1) and the third key (KEY3)) is transmitted from each of the first electronic device 601 and the third electronic device 603 to the server 610, the second electronic device 602 may receive the first key (KEY1) and the third key (KEY3) from the server 610.

Further, the third electronic device 603 may unlock the fourth data (LDATA4) through the first key (KEY1), the second key (KEY2), and the third key (KEY3). For example, the third electronic device 603 may receive the first key (KEY1) and the second key (KEY2) from the server 610 and receive the third key (KEY3) from the user of the third electronic device 603. At this time, approval information (for example, the first key (KEY1) and the second key (KEY2)) is transmitted from each of the first electronic device 601 and the second electronic device 602 to the server 610, the third electronic device 603 may receive the first key (KEY1) and the second key (KEY2) from the server 610.

The server 610 may control the operation of transmitting and receiving the data and the authentication information (for example, KEY1, KEY2, and KEY3) between the first electronic device 601, the second electronic device 602, and the third electronic device 603 The server 610 will be described in more detail with reference to FIG. 7.

Figure 7:
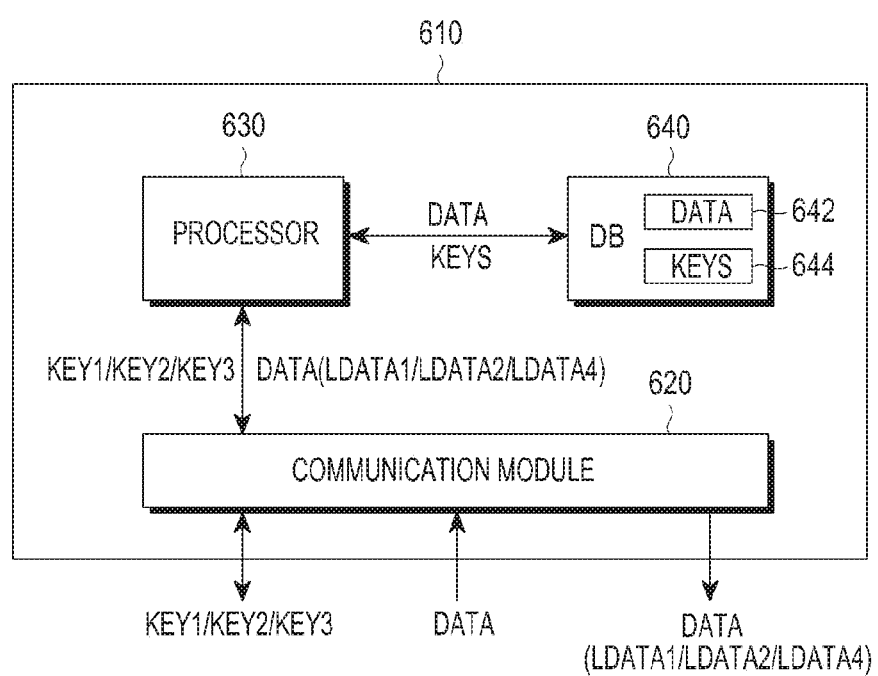
FIG. 7 is a schematic block diagram of the server illustrated in FIG. 6.

FIG. 7 is a schematic block diagram of the server illustrated in FIG. 6.

Referring to FIGS. 6 and 7, the server 610 may include the communication module 620, the processor 630, and a database 640.

The communication module 620 may receive the first key (KEY1) from the first electronic device 601, receive the second key (KEY2) from the second electronic device 602, and receive the third key (KEY3) from the third electronic device 603. The communication module 620 may transmit the first key (KEY1), the second key (KEY2), and the third key (KEY3) to the processor 630.

The communication module 620 may receive data (DATA) from the first electronic device 601 and transmit data (DATA) to the processor 630.

The communication module 620 may transmit data (DATA), first data (LDATA1), second data (LDATA2), and/or fourth data (LDATA4) to electronic devices 601, 602, and/or 603 according to a control of the processor 630.

The processor 630 may control the overall operation of the server 610.

According to an embodiment, the processor 630 may receive authentication information (for example, the first key (KEY1)) from the first electronic device 601 and register (or store) the first electronic device 601 in the database 640. Further, the processor 630 may receive authentication information (for example, the second key (KEY2)) from the second electronic device 602 and register the second electronic device 602 in the database 640. Similarly, the processor 630 may receive authentication information (for example, the third key (KEY3)) from the third electronic device 603 and register the third electronic device 603 in the database 640.

The processor 630 may control the server 610 to share data between the registered electronic devices 601, 602, and/or 603.

According to an embodiment, the processor 630 may receive data (DATA) from the first electronic device 601. Further, the processor 630 may generate first data (LDATA1), second data (LDATA2), and/or fourth data (LDATA4) in order to share data (DATA) with the second electronic device 602 and the third electronic device 603.

For example, the processor 630 may generate first data (LDATA1) through the first key (KEY1) and the second key (KEY2), generate second data (LDATA2) through the first key (KEY1) and the third key (KEY3), and generate fourth data (LDATA4) through the first key (KEY1), the second key (KEY2), and the third key (KEY3). At this time, the processor 630 may transmit the first data (LDATA1) and/or the fourth data (LDATA4) to the second electronic device 602 and transmit the second data (LDATA2) and/or the fourth data (LDATA4) to the third electronic device 603.

For example, the processor 630 may receive a generation signal of the event occurring in the second electronic device 602. At this time, the processor 630 may transmit the generation signal to the first electronic device 601. When the first electronic device 601 transmits the first key (KEY1) to the server 610, the processor 630 may transmit the first key (KEY1) to the second electronic device 602 if the first key (KEY1) received from the first electronic device 601 is the same as the first key (KEY1) stored in the database 640.

Similarly, the processor 630 may receive a generation signal of the event occurring in the third electronic device 603. At this time, the processor 630 may transmit the generation signal to the first electronic device 601. When the first electronic device 601 transmits the first key (KEY1) to the server 610, the processor 630 may transmit the first key (KEY1) to the third electronic device 603 if the first key (KEY1) received from the first electronic device 601 is the same as the first key (KEY1) stored in the database 640.

According to another embodiment, in the state in which the first electronic device 601, the second electronic device 602, and/or the third electronic device 603 access the server 610, the processor 630 may perform authentication of the first electronic device 601, the second electronic device 602, and/or the third electronic device 603.

For example, when the first key (KEY1) stored in the database 630 is the same as the first key (KEY1) received from the first electronic device 601 and the second key (KEY2) stored in the database 640 is the same as the second key (KEY2) received from the second electronic device 602, the processor 630 may transmit data (DATA) to the second electronic device 602.

Further, when the first key (KEY1) stored in the database 640 is the same as the first key (KEY1) received from the first electronic device 601 and the third key (KEY3) stored in the database 640 is the same as the third key (KEY3) received from the third electronic device 603, the processor 630 may transmit data (DATA) to the third electronic device 603.

Meanwhile, when the first key (KEY1) stored in the database 640 is the same as the first key (KEY1) received from the first electronic device 601, the second key (KEY2) stored in the database 640 is the same as the second key (KEY2) received from the second electronic device 602, and the third key (KEY3) stored in the database 640 is the same as the third key (KEY3) received from the third electronic device 603, the processor 630 may transmit data (DATA) to the second electronic device 602 and/or the third electronic device 603.

The database 640 may store the data (DATA) and keys (KEYs, for example, the first key (KEY1), the second key (KEY2), and/or the third key (KEY3)) according to a control of the processor 630.

Further, the database 640 may store (or register) electronic devices transmitting keys according to a control of the processor 630.

According to an embodiment, the database 640 may store the data (DATA) and the keys (KEYS) in a separate region. For example, the database 640 may store the data (DATA) in a first region 642 and the keys (KEYS) in a second region 644. At this time, the second region 644 storing the keys (KEYs) may be implemented as a security region.

The database 640 may transmit the stored data (DATA) and keys (KEYS, for example, the first key (KEY1), the second key (KEY2), and/or the third key (KEY3)) to the processor 630 according to the control of the processor 630.

Although FIG. 7 illustrates that the server 610 includes the database 640, the technical idea of the present disclosure is not limited thereto and the database 640 may be implemented separately from the server 610.

Figure 8:
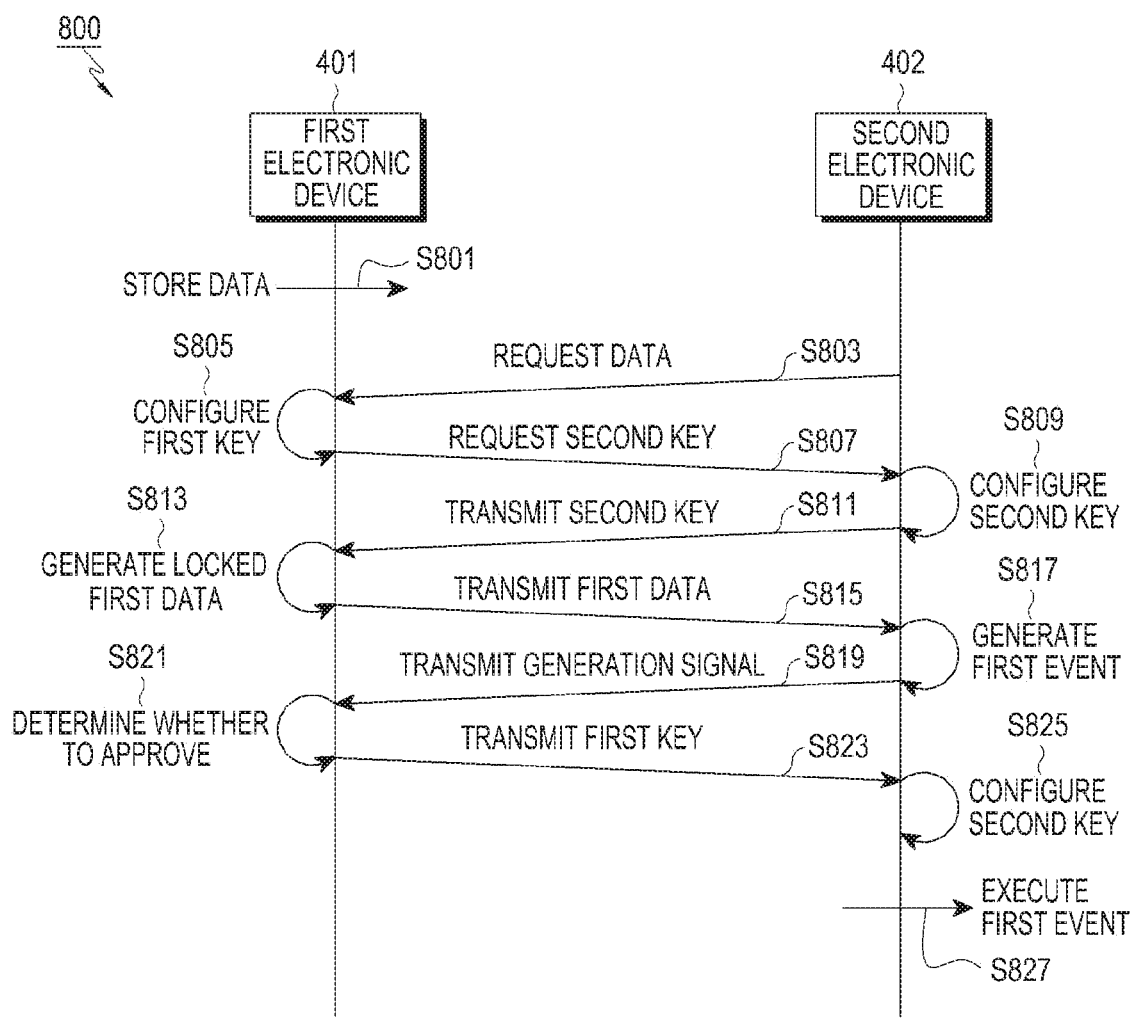
FIG. 8 is a data flow illustrating the operation of an electronic system according to various embodiments of the present disclosure.

FIG. 8 is a data flow illustrating the operation of an electronic system according to various embodiments of the present disclosure.

Referring to FIGS. 4, 5, and 8, an electronic system 800 may be implemented to be substantially the same as or similar to the electronic system 400 illustrated in FIG. 4.

The first electronic device 401 may store data in S801. For example, the first electronic device 401 may determine whether to perform a multi-locking function on the data.

The second electronic device 402 may make a request for data to the first electronic device 401 in S803. Further, although the second electronic device 402 does not make a request for data to the first electronic device 401, the first electronic device 401 may make a request for transmitting (sharing) data to the second electronic device 402.

The first electronic device 401 may configure the first key (KEY1) for the data in response to the request for the data in S805.

The first electronic device 401 may make a request for the second key (KEY2) of the second electronic device 402 for the data in S807.

The second electronic device 402 may configure the second key (KEY2) in S809.

The second electronic device 402 may transmit the configured second key (KEY2) to the first electronic device 401 in S811.

The first electronic device 401 may generate first data (LDATA1) through the first key (KEY1) and the second key (KEY2) in S813. For example, the first electronic device 401 may lock data through the first key (KEY1) and the second key (KEY2). That is, the first data (LDATA1) generated by the first electronic device 401 may be unlocked using the first key (KEY1) and the second key (KEY2).

The first electronic device 401 may transmit the first data (LDATA1) to the second electronic device 402 in S815.

The second electronic device 402 may generate (or execute) a first event for the first data (LDATA1) in S817. For example, the second electronic device 402 may open the first data (LDATA1).

The second electronic device 402 may transmit a generation signal of the first event occurring in the second electronic device 402 to the first electronic device 401 in S819. At this time, the generation signal may include information for making a request for approving the first event.

The first electronic device 401 may determine whether to approve the first event. At this time, the user of the first electronic device 401 may determine (or decide) whether to approve the first event by inputting the first key (KEY1) to the first electronic device 401 in S821.

When the first event is approved, the first electronic device 401 may transmit the first key (KEY1) to the second electronic device 402 in S823. On the other hand, when the first event is not approved, the first electronic device 401 may not transmit the first key (KEY1) to the second electronic device 402. At this time, the first electronic device 401 may transmit information different from the first key (KEY1) or transmit no information.

The user of the second electronic device 402 may input the second key (KEY2) to the second electronic device 402 in S825.

The second electronic device 402 may execute the first event through the first key (KEY1) received from the first electronic device 401 and the input second key (KEY2) in S827. For example, when the first key (KEY) configured in the first data (LDATA1) is the same as the first key (KEY1) received from the first electronic device 401 and the second key (KEY2) configured in the first data (LDATA1) is the same as the input second key (KEY2), the second electronic device 402 may open the first data (LDATA1).

Figure 9:
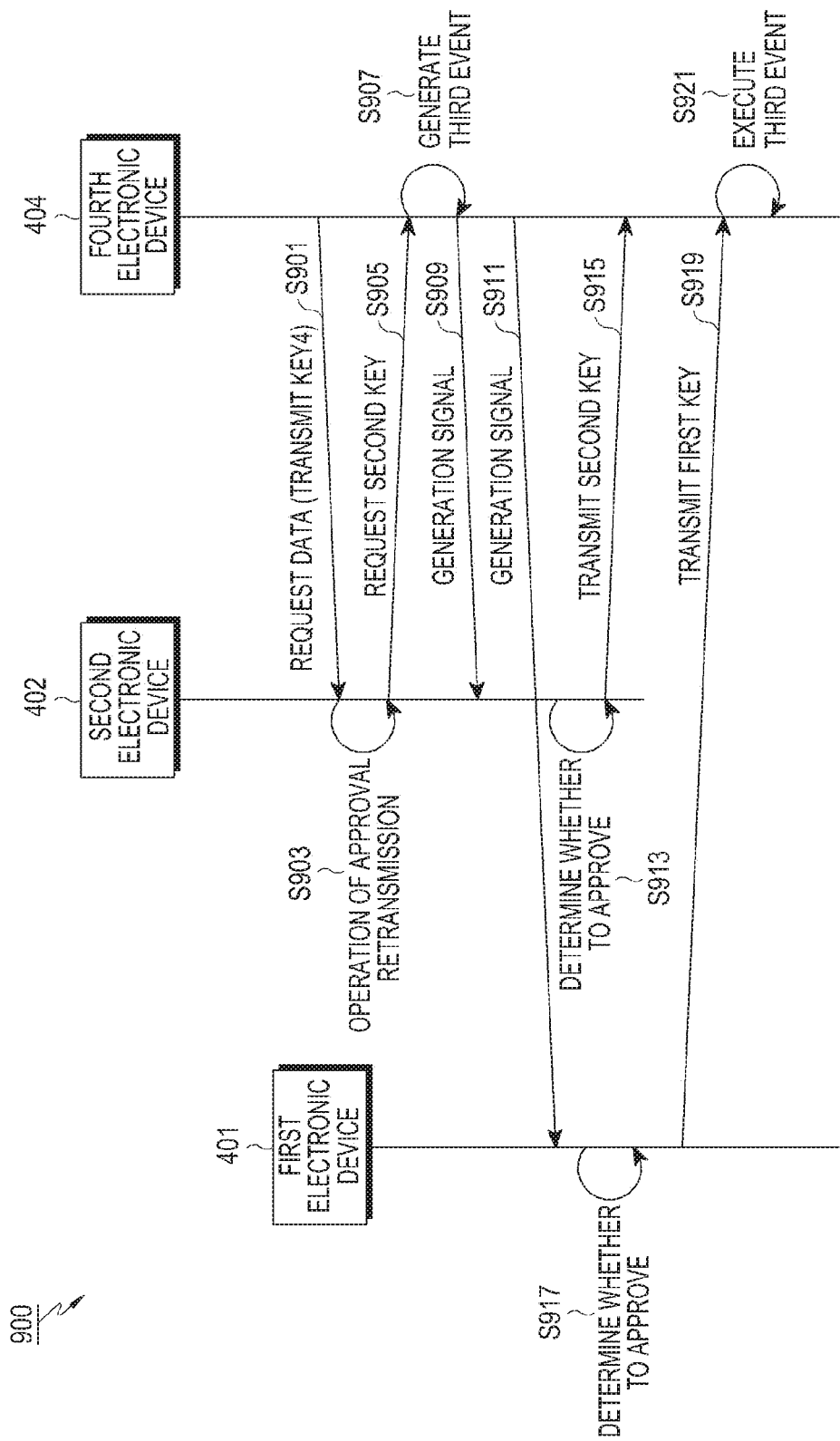
FIG. 9 is a data flow for describing the operation of an electronic system according to various embodiments of the present disclosure.

FIG. 9 is a data flow for describing the operation of an electronic system according to various embodiments of the present disclosure.

Referring to FIGS. 4, 5, 8, and 9, an electronic system 900 may be implemented to be substantially the same as or similar to the electronic system 400 illustrated in FIG. 4 and the electronic system 800 illustrated in FIG. 8.

In FIG. 9, a first event occurring in the second electronic device 402 may be an event for re-transmitting first data (LDATA1) to the fourth electronic device 404.

The fourth electronic device 404 may make a request for the first data (LDATA1) to the second electronic device in S901. At this time, the fourth electronic device 404 may transmit the fourth key (KEY4) to the second electronic device 402.

Meanwhile, even though the fourth electronic device 404 does not make a request for the first data (LDATA1) to the second electronic device 402, the second electronic device 402 may make a request for transmitting (or sharing) data to the fourth electronic device 404. At this time, the second electronic device 402 may make a request for transmitting the fourth key (KEY4) to the fourth electronic device 404.

The second electronic device 402 may perform operations for approving retransmission of the first data (LDATA1) to the fourth electronic device 404 in S903. At this time, the operations for approving the retransmission may be implemented to be substantially the same as the operations for executing the first event occurring in the second electronic device described in FIG. 8.

According to an embodiment, the second electronic device 402 may transmit the first data (LDATA1) to the fourth electronic device 404 in S905.

According to another embodiment, the second electronic device 402 may transmit third data (LDATA3) to the fourth electronic device 404. At this time, the second electronic device 402 may generate locked third data (LDATA3) by adding the fourth key to the first data (LDATA1).

The second electronic device 402 may transmit the first data (LDATA1) to the fourth electronic device 404 in S905. The fourth electronic device 404 may execute a third event for the first data (LDATA1) in S907. For example, the fourth electronic device 404 may open the first data (LDATA1).

Similarly, the second electronic device 402 may transmit third data (LDATA3) to the fourth electronic device 404. The fourth electronic device 404 may execute the third event for the third data (LDATA3). For example, the fourth electronic device 404 may open the third data (LDATA3).

When the third event occurs in the fourth electronic device 404, the fourth electronic device 404 may transmit a generation signal of the third event to each of the second electronic device 402 and the first electronic device 401 in S909 and S911.

The second electronic device 402 may determine whether to approve the third event in response to the received generation signal in S913. For example, the user of the second electronic device 402 may determine whether to approve the third event by inputting the second key (KEY2) to the second electronic device 402.

When the second electronic device 402 approves the third event, the second electronic device 402 may transmit the second key (KEY2) to the fourth electronic device 404 in S915. On the other hand, when the second electronic device 402 does not approve the third event, the second electronic device 402 may not transmit the second key (KEY2).

Similarly, the first electronic device 401 may determine whether to approve the third event in response to the received generation signal in S917. For example, the user of the first electronic device 401 may determine whether to approve the third event by inputting the first key (KEY1) to the first electronic device 401.

When the first electronic device 401 approves the third event, the first electronic device 401 may transmit the first key (KEY1) to the fourth electronic device 404 in S919. On the other hand, when the first electronic device 401 does not approve the third event, the first electronic device 401 may not transmit the first key (KEY1).

When receiving the first key (KEY1) and the second key (KEY2), the fourth electronic device 404 may unlock the first data (LDATA1) through the first key (KEY1) and the second key (KEY2). That is, the fourth electronic device 404 may execute an event for the first data (LDATA1) through the first key (KEY1) and the second key (KEY2) in S921. For example, the fourth electronic device 404 may open the first data (LDATA1) through the first key (KEY1) and the second key (KEY2).

Further, when receiving the first key (KEY1) and the second key (KEY2), the fourth electronic device 404 may unlock the first data (DLATA1) through the first key (KEY1), the second key (KEY2), and the fourth key (KEY4). Unique authentication information (for example, the fourth key (KEY4) of the fourth electronic device 404 may be input to the fourth electronic device 404. At this time, the fourth electronic device 404 may execute the event for the first data (LDATA1) through the first key (KEY1), the second key (KEY2), and the fourth key (KEY4) in S921. For example, the fourth electronic device 404 may open the first data (LDATA1) through the first key (KEY1), the second key (KEY2), and the fourth key (KEY4).

Figure 10A:
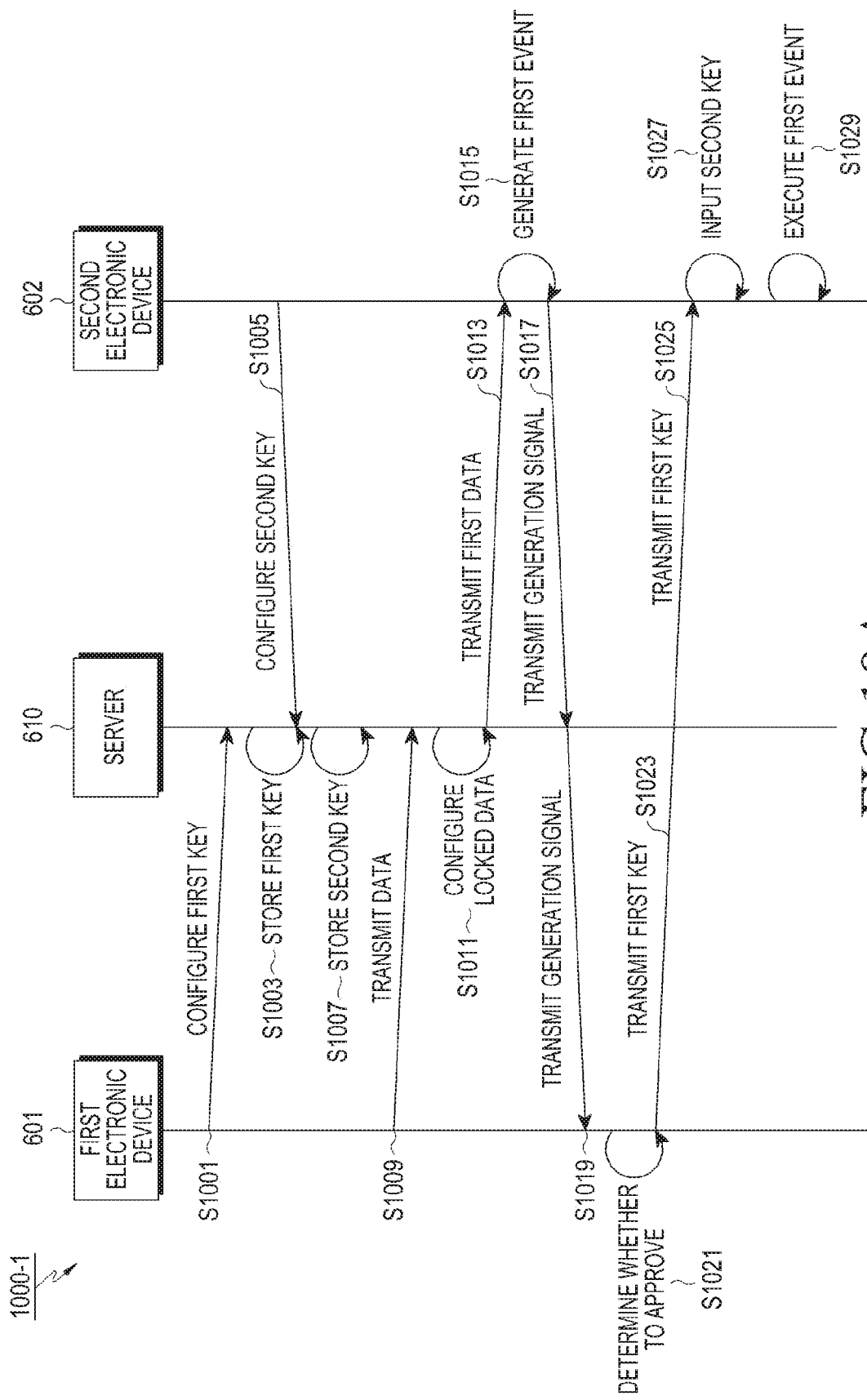
FIG. 10A is a data flow illustrating the operation of an electronic system according to various embodiments of the present disclosure.

FIG. 10A is a data flow illustrating the operation of an electronic system according to various embodiments of the present disclosure.

Referring to FIGS. 6, 7, and 10A, an electronic system 1000-1 may be implemented to be substantially the same as or similar to the electronic system 600 described in FIG. 6.

The first electronic device 601 may configure the first key (KEY1) through the server 610 in S1001. For example, the first electronic device 601 may access the server 610. At this time, the user of the first electronic device 601 may input authentication information (for example, the first key (KEY1)) to the first electronic device 601 and the first electronic device 601 may transmit the input first key (KEY1) to the server 610.

The server 610 may store the first key (KEY1) in the database 640 in S1003. At this time, the server 610 may register the first electronic device 601 in the server 610. For example, the server 610 may provide identification information (for example, ID information) to the first electronic device 601.

Similarly, the second electronic device 602 may configure the second key (KEY2) through the server 610 in S1005. For example, the second electronic device 602 may access the server 610. At this time, the user of the second electronic device 602 may input authentication information (for example, the second key (KEY2)) to the second electronic device 602 and the second electronic device 602 may transmit the input second key (KEY2) to the server 610.

The server 610 may store the second key (KEY2) in the database 640 in S1007. At this time, the server 610 may register the second electronic device 602 in the server 610.

For example, the server 610 may provide identification information (for example, ID information) to the second electronic device 602.

The first electronic device 601 may transmit data (DATA) to the server 610 in S1009. For example, the first electronic device 601 may transmit the data (DATA) to the server 610 and share the data (DATA) with electronic devices registered in the server.

The server 610 may lock the data (DATA) through the first key (KEY1) and the second key (KEY2). That is, the server 610 may generate locked first data (LDATA1) through the first key (KEY1) and the second key (KEY2) in 51011.

The server 610 may transmit (or share) the first data (LDATA1) to the second electronic device 602 in S1013. For example, the server 610 may transmit the first data (LDATA1) to the second electronic device 602 in response to a request signal of the data (DATA) from the second electronic device 602. Further, the server 610 may transmit the first data (LDATA1) to the second electronic device 602 in response to a transmission request signal of the data (DATA) from the first electronic device 601.

The second electronic device 602 may execute an event for the first data (LDATA1) in S1015. For example, the second electronic device 602 may open the first data (LDATA1).

When a first event for the first data (LDATA1) occurs in the second electronic device 602, the second electronic device 602 may transmit a generation signal of the first event to the server 610 in S1017.

The server 610 may transmit the generation signal of the first event to the first electronic device 601 in S1019.

The first electronic device 601 may determine whether to approve the first event in S1021. For example, the user of the first electronic device 601 may determine whether to approve the first event by inputting the first key (KEY1) to the first electronic device 601.

When the first electronic device 601 approves the first event, the first electronic device 601 may transmit the first key (KEY1) to the server 610 in 51023. On the other hand, when the first electronic device 601 does not approve the first event, the first electronic device 601 may not transmit the first key (KEY1).

When the server 610 receives the first key (KEY1) from the first electronic device 601, the server 610 may transmit the first key (KEY1) to the second electronic device 602 in S1025.

The user of the second electronic device 602 may input the second key (KEY2) to the second electronic device 602 in S1027.

The second electronic device 602 may unlock the first data (LDATA1) through the first key (KEY1) and the second key (KEY2). That is, the second electronic device 602 may execute the first event of the first data (LDATA1) through the first key (KEY1) and the second key (KEY2) in S1029. For example, the second electronic device 602 may open the first data (LDATA1) through the first key (KEY1) and the second key (KEY2).

Figure 10B:
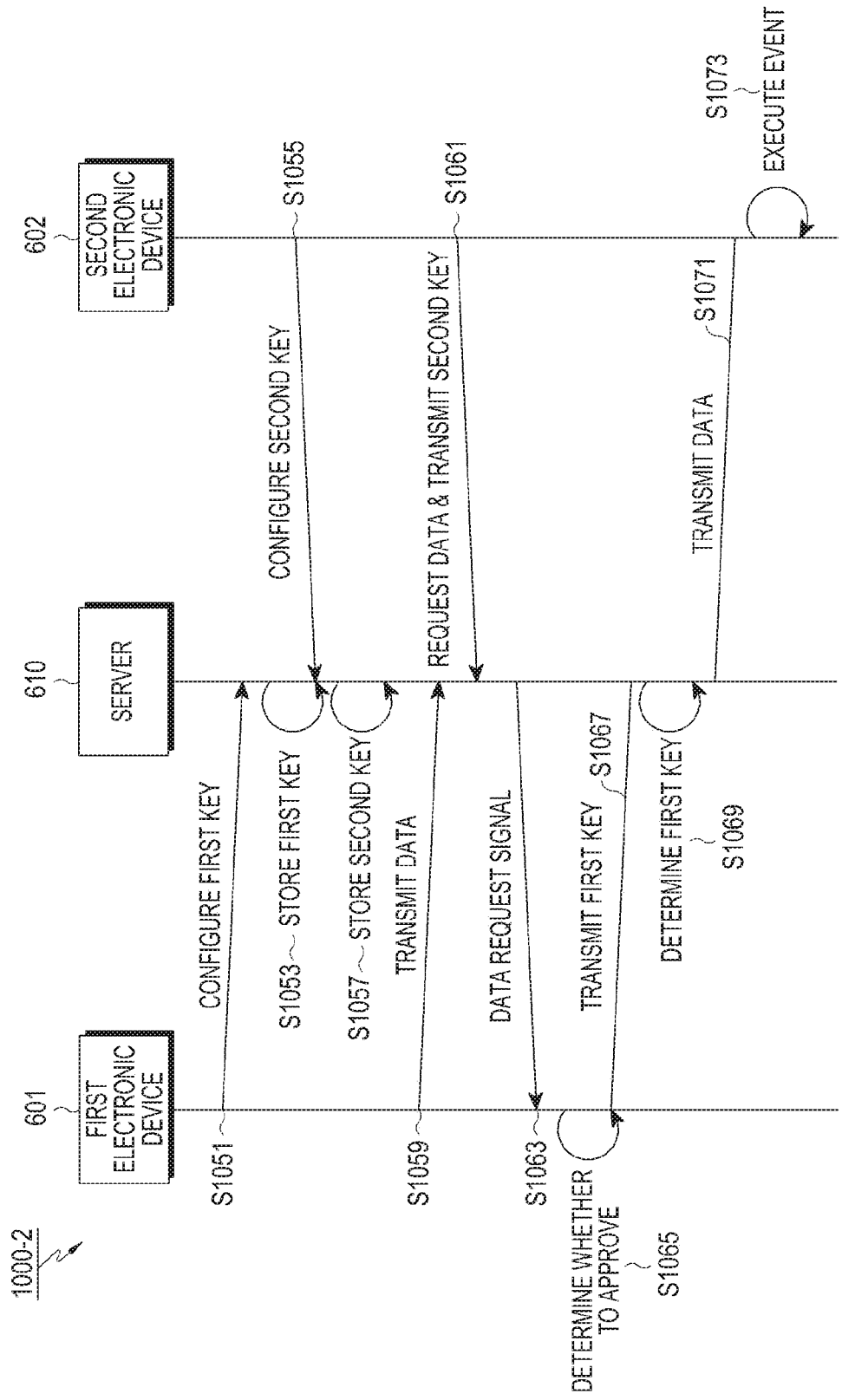
FIG. 10B is a data flow for describing the operation of an electronic system according to various embodiments of the present disclosure.

FIG. 10B is a data flow for describing the operation of an electronic system according to various embodiments of the present disclosure.

Referring to FIGS. 6, 7, and 10B, an electronic system 1000-2 may be implemented to be substantially the same as or similar to the electronic system 600 illustrated in FIG. 6.

The first electronic device 601 may configure the first key (KEY1) through the server 610 in S1051. For example, the first electronic device 601 may access the server 610. At this time, the user of the first electronic device 601 may input authentication information (for example, the first key (KEY1)) to the first electronic device 601 and the first electronic device 601 may transmit the input first key (KEY1) to the server 610.

The server 610 may store the first key (KEY1) in the database 610 in 51053. At this time, the server 610 may register the first electronic device 601 in the server 610. For example, the server 610 may provide identification information (for example, ID information) to the first electronic device 601.

Similarly, the second electronic device 602 may configure the second key (KEY2) through the server 610 in 51055. For example, the second electronic device 602 may access the server 610. At this time, the user of the second electronic device 602 may input authentication information (for example, the second key (KEY2)) to the second electronic device 602 and the second electronic device 602 may transmit the input second key (KEY2) to the server 610.

The server 610 may store the second key (KEY2) in the database 640 in S1057. At this time, the server 610 may register the second electronic device 602 in the server 610. For example, the server 610 may provide identification information (for example, ID information) to the second electronic device 602.

The first electronic device 601 may transmit data (DATA) to the server 610 in S1059. For example, the first electronic device 601 may transmit the data (DATA) to the server 610 and share the data (DATA) with electronic devices registered in the server.

The second electronic device 602 may transmit a request signal of the data (DATA) to the server 610 in S1061. Further, the second electronic device 602 may transmit the second key (KEY2) to the server 610 in S1061. For example, the second electronic device 602 may access the server 610. At this time, the user of the second electronic device 602 may input authentication information (for example, the second key (KEY2)) to the second electronic device 602 and the second electronic device 602 may transmit the input second key (KEY2) to the server 610.

When the server 610 receives the second key (KEY2) from the second electronic device 602, the server 610 may determine whether the second key (KEY2) received from the second electronic device 602 is the same as the second key (KEY2) stored in the database 640.

When the first key (KEY1) received from the first electronic device 601 is the same as the first key (KEY1) stored in the database 640, the server 610 may transmit a request signal of the data (DATA) to the first electronic device 601 in S1063. For example, the request signal may be a signal making a request for transmitting (or sharing) the data (DATA) by the second electronic device 602.

The first electronic device 601 may determine whether to approve transmission (or sharing) of the data (DATA) I S1065. For example, the user of the first electronic device 601 may determine whether to approve transmission (or sharing) of the data (DATA) by inputting the first key (KEY1) to the first electronic device 601.

When the first electronic device 601 approves the transmission (or sharing) of the data (DATA), the first electronic device 601 may transmit the first key (KEY1) to the server 610 in 51067. On the other hand, when the first electronic device 601 does not approve the transmission (or sharing) of the data (DATA), the first electronic device 601 may not transmit the first key (KEY1).

When the server 610 receives the first key (KEY1) from the first electronic device 601, the server 610 may determine whether the first key (KEY1) received from the first electronic device 610 is the same as the first key (KEY1) stored in the database 640 in S1069.

When the first key (KEY1) received from the first electronic device 601 is the same as the first key (KEY1) stored in the database 640, the server 610 may transmit the data (DATA) to the second electronic device 602 in S1071.

On the other hand, when the first key (KEY1) received from the first electronic device 601 is not the same as the first key (KEY1) stored in the database 640, the server 610 may not transmit the data (DATA) to the second electronic device 602.

The second electronic device 602 may receive the data (DATA) and execute an event for the data (DATA) in S1073. For example, the second electronic device 602 may open the data (DATA).

Figure 11:
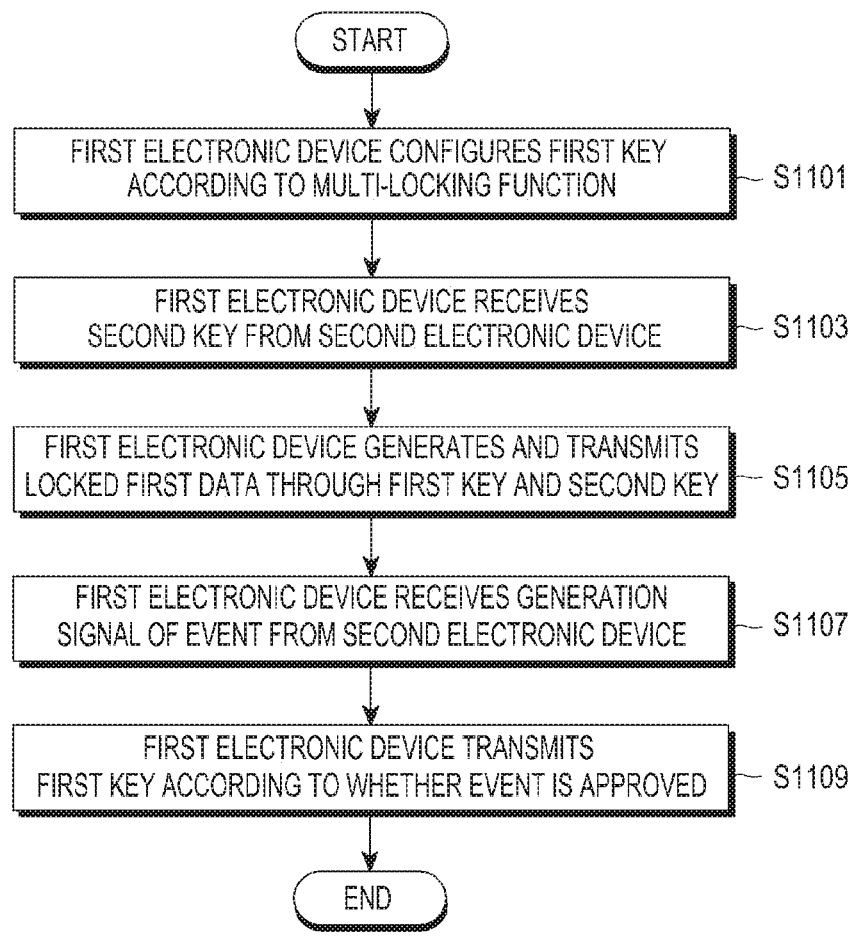
FIG. 11 is a flowchart illustrating the operation of an electronic system according to various embodiments of the present disclosure.

FIG. 11 is a flowchart illustrating the operation of an electronic system according to various embodiments of the present disclosure.

Referring to FIGS. 4, 5, 8, 9, and 11, the first electronic device 401 may perform a multi-locking function on data.

The first electronic device 401 may configure the first key (KEY1) for data according to the multi-locking function in S1101.

The first electronic device 401 may receive the second key (KEY2) from the second electronic device 402 in order to transmit (or share) data in S1103.

The first electronic device 401 may generate first data (LDATA1) by locking the data through the first key (KEY1) and the second key (KEY2) in S1105. Further, the first electronic device 401 may transmit (or share) the first data (LDATA1) to the second electronic device 402 in S1105.

When the second electronic device 402 executes a first event for the first data (LDATA1), the first electronic device 401 may receive a generation signal of the first event in S1107.

The first electronic device 401 may determine whether to approve the first event for the first data (LDATA1) occurring in the second electronic device 402.

The first electronic device 401 may transmit the first key (KEY1) to the second electronic device 402 according to whether the first event is approved in S1109. When the second electronic device 402 receives the first key (KEY1), the second electronic device 402 may unlock the first data (LDATA1) through the first key (KEY1) and the second key (KEY2) and execute the first event for the first data (LDATA1).

Figure 12A:
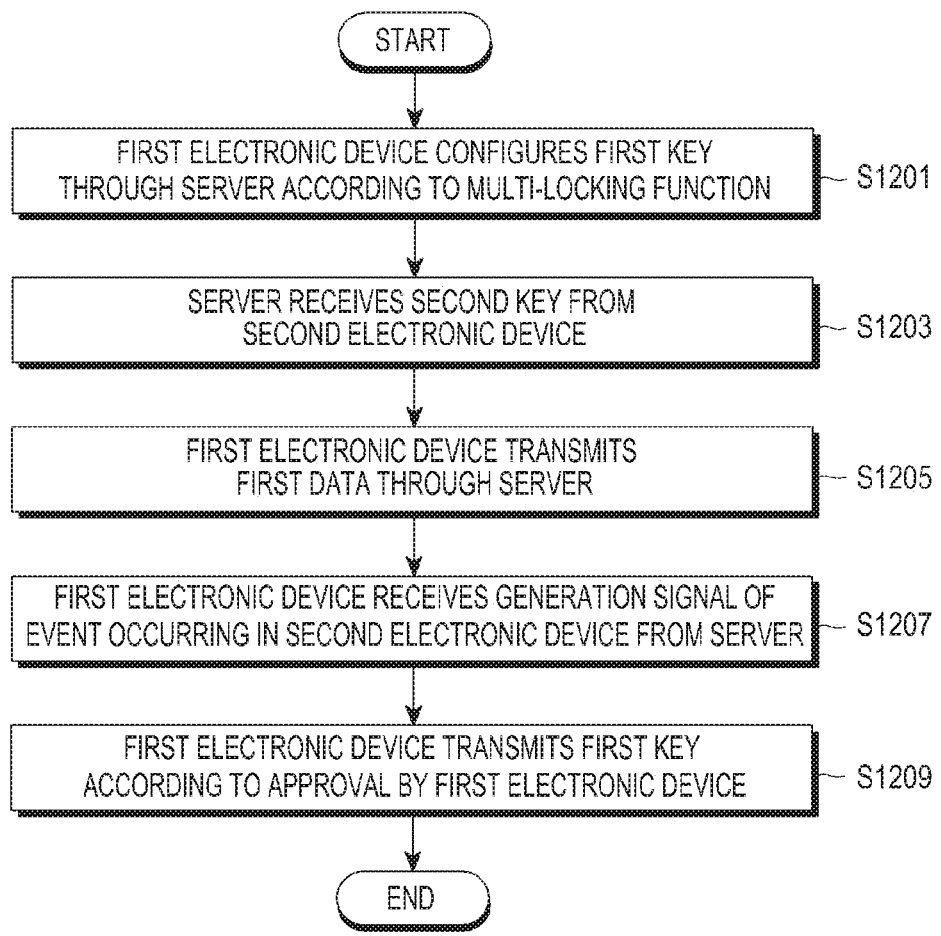
FIG. 12A is a flowchart illustrating the operation of an electronic system according to various embodiments of the present disclosure.

FIG. 12A is a flowchart illustrating the operation of an electronic system according to various embodiments of the present disclosure.

Referring to FIGS. 6, 7, 10A, 10B, and 12A, the first electronic device 601 may configure a multi-locking function.

The first electronic device 601 may configure the first key (KEY1) through the server 610 according to the multi-locking function in S1201.

The server 610 may receive the second key (KEY2) from the second electronic device 402 in order to transmit (or share) data (DATA) in S1203.

The first electronic device 601 may transmit first data (LDATA1) corresponding to the data (DATA) to the second electronic device 602 through the server 610 in S1205.

The first electronic device 601 may receive a generation signal of a first event occurring in the second electronic device 602 from the server 610 in S1207.

The first electronic device 601 may determine whether to approve the first event and transmit the first key (KEY1) to the server 610 depending on the determination result in S1209. For example, when the first electronic device 601 approves the first event, the first electronic device 601 may transmit the first key (KEY1) to the second electronic device 602 through the server 610.

The second electronic device 602 may unlock the first data (LDATA1) through the first key (KEY1) and the second key (KEY2) and execute the first event for the first data (LDATA1).

Figure 12B:
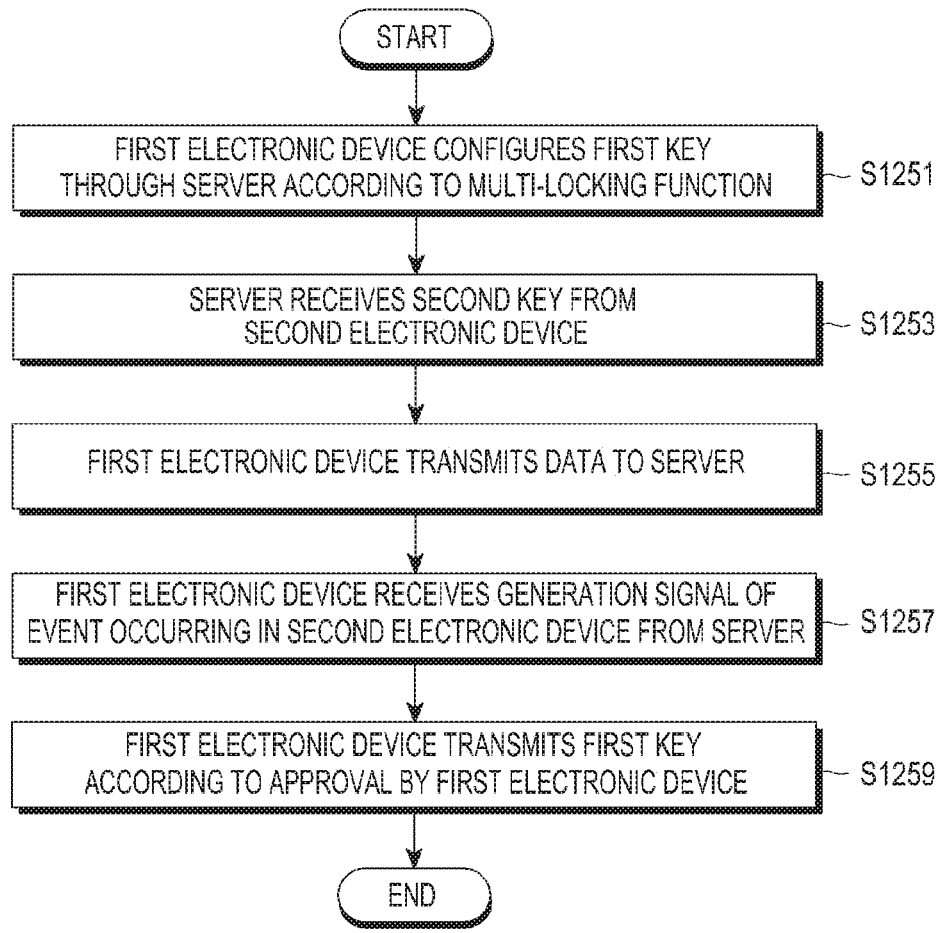
FIG. 12B is a flowchart illustrating the operation of an electronic system according to various embodiments of the present disclosure.

FIG. 12B is a flowchart illustrating the operation of an electronic system according to various embodiments of the present disclosure.

Referring to FIGS. 6, 7, 10A, 10B, and 12B, the first electronic device 601 may configure a multi-locking function.

The first electronic device 601 may configure the first key (KEY1) through the server 610 according to the multi-locking function in S1251.

The server 610 may receive the second key (KEY2) from the second electronic device 402 in order to transmit (or share) data (DATA) in S1253.

The first electronic device 601 may transmit the data (DATA) to the server 610 in S1255. For example, the server 610 may store the data (DATA) in the database 640.

The first electronic device 601 may receive a request signal of the data (DATA) transmitted from the second electronic device 602 through the server 610 in S1257.

The first electronic device 601 may determine whether to transmit (or share) the data (DATA) and transmit the first key (KEY1) to the server 610 depending on the determination result in S1259. For example, when the first electronic device 601 approves the transmission (or sharing) of the data (DATA), the first electronic device 601 may transmit the first key (KEY1) to the server 610.

The second electronic device 602 may receive the data (DATA) from the server 610 and execute the first event for the data (DATA).

Figure 13:
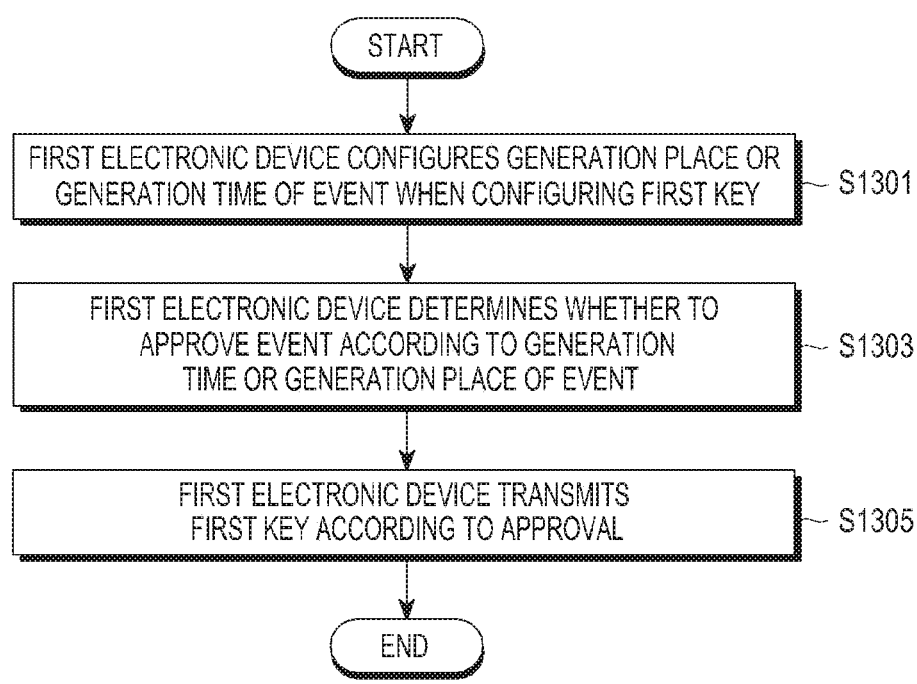
FIG. 13 is a flowchart illustrating the operation of an electronic system according to various embodiments of the present disclosure.

FIG. 13 is a flowchart illustrating the operation of an electronic system according to various embodiments of the present disclosure.

Referring to FIGS. 4 to 13, the first electronic device 401 or 601 may perform a multi-locking function on data.

According to an embodiment, when the first electronic device 401 or 601 configures the first key (KEY1) for data (DATA), the first electronic device 401 or 601 may configure information on the generation place or the generation time of an event corresponding to the data in S1301.

For example, the first electronic device 401 or 601 may configure the first key (KEY1) to open only for particular data only in a particular place. Further, the first electronic device 401 or 601 may configure the first key (KEY1) to open only for particular data during a particular time or period.

The first electronic device 401 or 601 may determine whether to approve the event according to the generation time or the generation place of the event corresponding to the data (DATA) in S1303.

For example, the first electronic device 401 or 601 may identify that a place is the generation place of the event for particular data. Further, the first electronic device 401 or 601 may identify that a time is the generation time of the event for particular data.

The first electronic device 401 or 601 may transmit the first key (KEY1) to the second electronic device 402 or the server 610 according to whether the event is approved in S1305. That is, when the generation time or the generation place of the event corresponding to the data (DATA) is the same as a preset time or place, the first electronic device 401 or 601 may transmit the first key (KEY1) to the second electronic device 402 or the server 610.

For example, when the generation place of the event for particular data is different from a particular place, the first electronic device 401 or 601 may not transmit the first key. Further, when the generation time of the event for particular data is different from a particular time, the first electronic device 401 or 601 may not transmit the first key.

Figure 14:
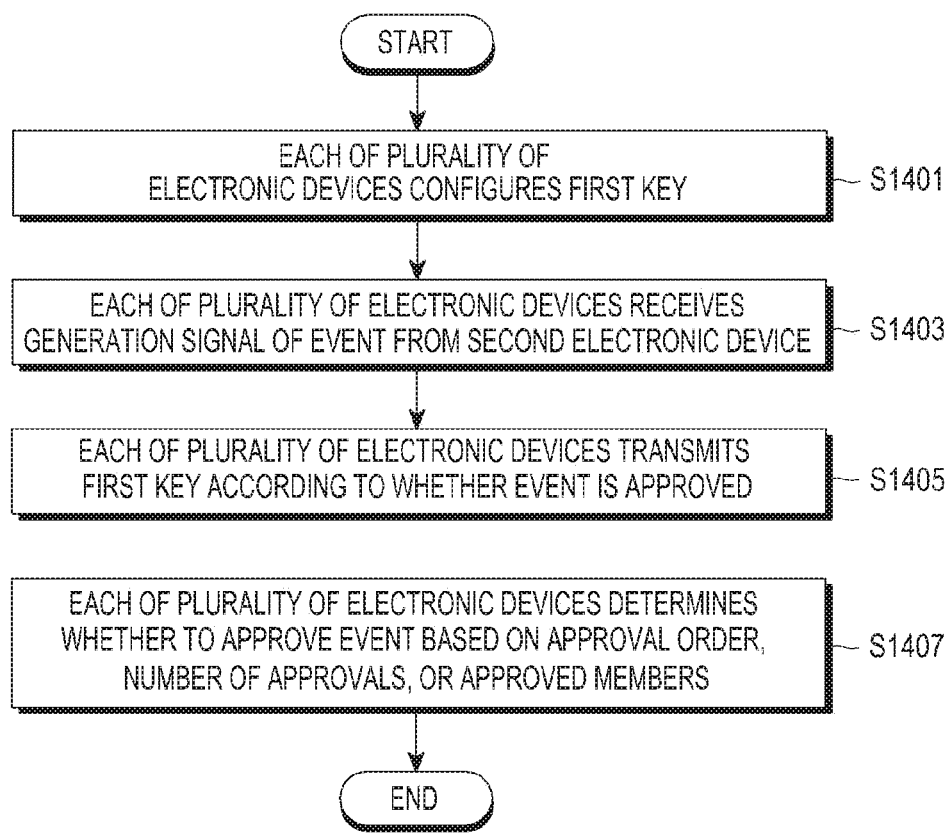
FIG. 14 is a flowchart illustrating the operation of an electronic system according to various embodiments of the present disclosure.

FIG. 14 is a flowchart illustrating an operation of the electronic device according to various embodiments of the present disclosure.

Referring to FIGS. 4 to 14, the first electronic device 401 or 601 may perform a multi-locking function on data.

According to an embodiment, a plurality of first electronic devices may configure the first keys in S1401. At this time, the first electronic devices may configure the first keys on the basis of the same or different pieces of authentication information.

One (for example, the electronic device 401 or 601) of the plurality of first electronic devices may lock data through the first keys configured by the plurality of first electronic devices and the second key configured by the second electronic device, and generate locked first data corresponding to the data. Further, at least one of the plurality of first electronic devices may transmit the first data to the second electronic device 402 or 602.

Each of the plurality of first electronic devices may receive a generation signal of a first event for the first data from the second electronic device 402 or 602 in S1403.

Each of the plurality of first electronic devices may determine whether to approve the first event. Further, the plurality of first electronic devices may transmit the first keys to the second electronic device 402 or 602 according to whether the first event is approved in S1405.

The second electronic device 402 or 602 may receive the first keys. Further, the second electronic device 402 or 602 may execute the event for the first data through the first keys and the second key (KEY2).

According to an embodiment, whether the first event is approved may be determined on the basis of the approval order, the number of approvals, and/or approved members of the plurality of first electronic devices in S1407.

For example, the approval order may be the order in which the second electronic device 402 or 602 receives the first keys from the plurality of first electronic devices. That is, when the plurality of first electronic devices configures the first keys, the order in which the second electronic device 402 or 602 receives the first keys may be configured to unlock the first data.

For example, the number of approvals may be the number of first keys which the second electronic device 402 or 602 receives from the plurality of first electronic devices. That is, when the plurality of first electronic devices configure the first keys, it may be configured such that the second electronic device 402 or 602 receives a predetermined number or more of first keys among the first keys to unlock the first data.

For example, the approval members may be electronic devices transmitting first keys to the second electronic device 402 or 602 among the plurality of first electronic devices. That is, when the plurality of first electronic devices configures the first keys, it may be configured such that the second electronic device 402 or 602 receives the first key from a particular electronic device among the first keys.

For example, when a particular electronic device of the plurality of first electronic devices is designated as a master, the second electronic device 402 or 602 is required to necessarily receive the first key from the particular electronic device designated as the master in order to unlock the first data.

For example, although the second electronic device 402 or 602 receives the first keys from the remaining electronic devices other than the particular electronic device designated as the master among the plurality of first electronic devices, the second electronic device 402 or 602 cannot unlock the first data. On the other hand, when the second electronic device 402 or 602 does not receive the first keys from the remaining electronic devices other than the particular electronic device designated as the master among the plurality of first electronic devices but receives the first key from the particular electronic device, the second electronic device 402 or 602 may unlock the first data.

Figure 15:
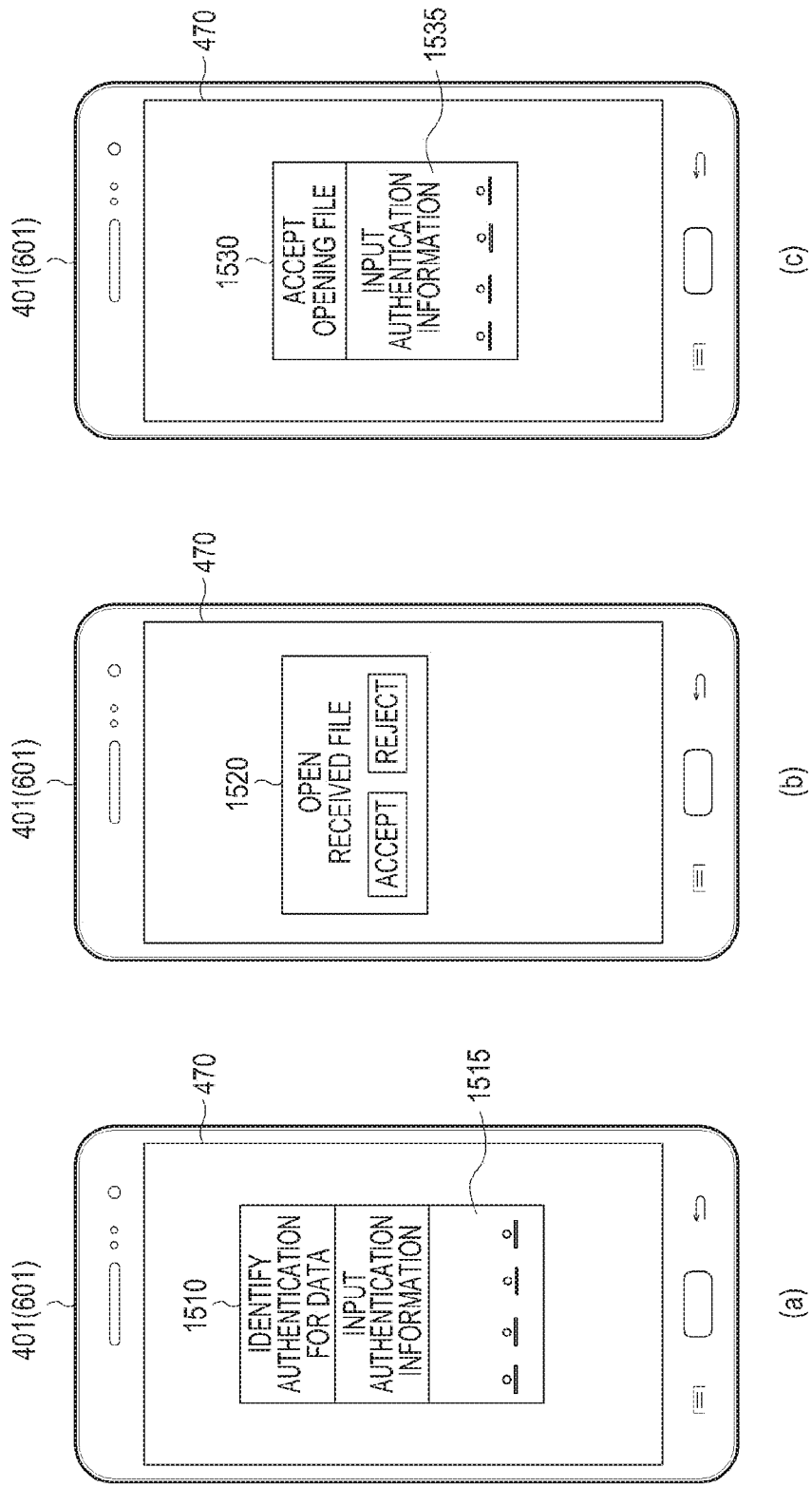
FIG. 15 illustrates a user interface displayed on the first electronic device according to various embodiments of the present disclosure.

FIG. 15 illustrates a user interface displayed on the first electronic device according to various embodiments of the present disclosure.

Referring to FIGS. 4 to 15, the first electronic device 401 or 601 may perform a multi-locking function on data (DATA).

According to an embodiment, the first electronic device 401 or 601 may perform the multi-locking function on data through a user interface displayed on the display 470. For example, the display 470 may include the touch screen 475.

Referring to FIG. 15A, the first electronic device 401 or 601 may display an authentication identification window 1510 for data (DATA). The authentication identification window 1510 may include an authentication information input window 1515 into which authentication information is input.

According to an embodiment, the user of the first electronic device 401 or 601 may configure the first key (KEY1) by inputting the authentication information for the data (DATA) into the authentication information window 1515.

For example, the user of the first electronic device 401 or 601 may input a password or a passcode as the authentication information for the data (DATA). That is, the first key (KEY1) may be implemented as the input password or passcode.

Referring to FIG. 15B, the first electronic device 401 or 601 may receive a generation signal of a first event occurring in the second electronic device 402 or 602 corresponding to the data (DATA). For example, the first electronic device 401 or 601 may display an event generation window 1520 in response to the generation signal.

The first electronic device 401 or 601 may determine whether to approve the first event. For example, the user of the first electronic device 401 or 601 may determine whether to approve the first event by inputting an accept or reject icon of the authentication identification window 1510.

Referring to FIG. 15C, when the user of the first electronic device 401 or 601 selects the accept icon of the authentication identification window 1510, the first electronic device 401 or 601 may display an event approval window 1530 for approving the first event. For example, the event approval window 1530 may include an authentication information input window 1535 to which authentication information is input by the user of the first electronic device 401 or 601.

According to an embodiment, the user of the first electronic device 401 or 601 may input the first key (KEY1) for the data (DATA) to the authentication information window 1535.

For example, the user of the first electronic device 401 or 601 may input a password or a passcode as the first key (KEY1) for the data (DATA).

The first electronic device 401 or 601 may transmit the first key (KEY1) to the second electronic device 402 or 602. Further, the first electronic device 401 or 601 may determine whether the input first key (KEY1) is the same as the configured first key (KEY1) and transmit the first key (KEY1) to the second electronic device 402 or 602 according to the determination result (for example, when the first keys are the same as each other).

Figure 16:
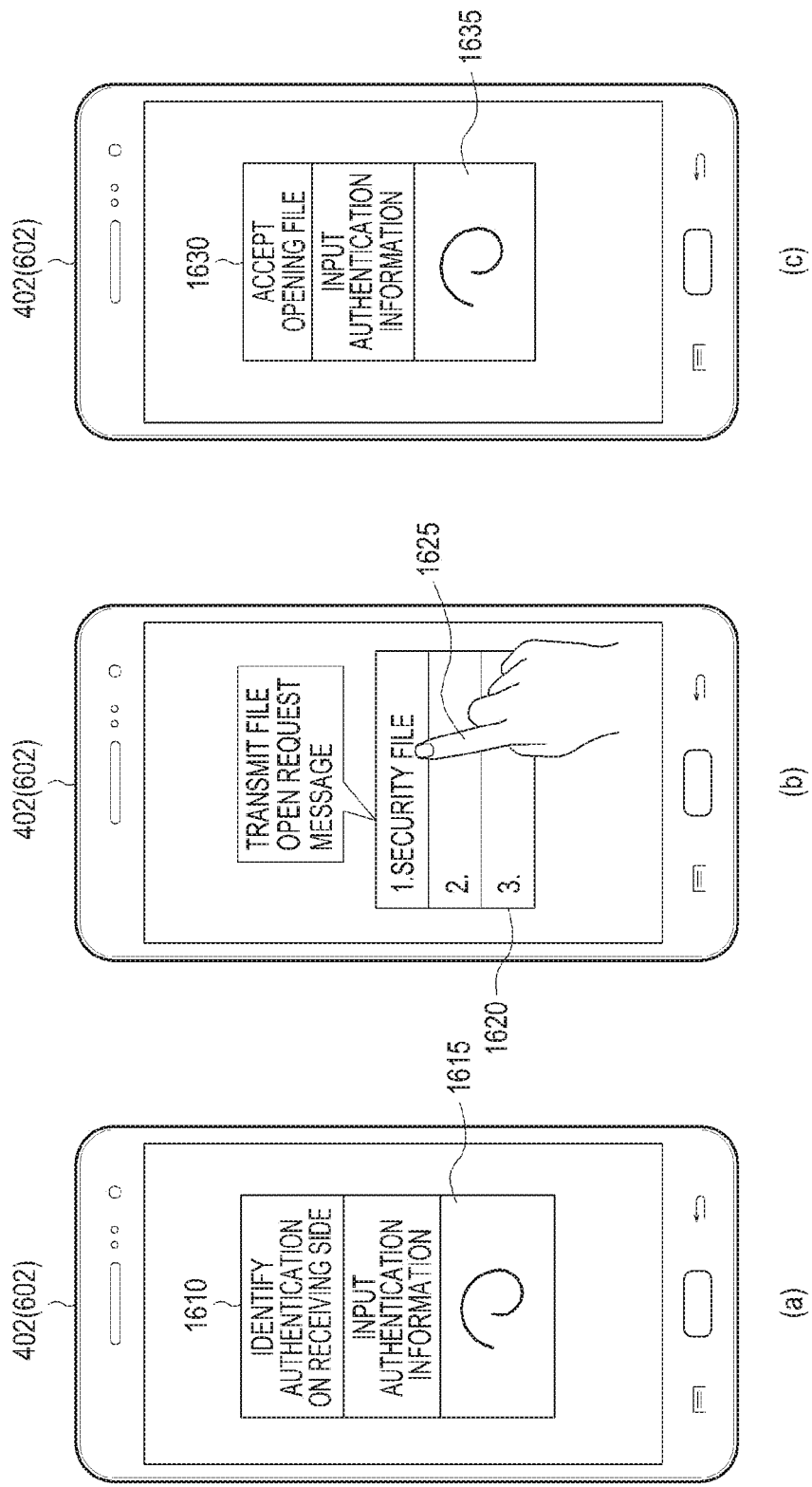
FIG. 16 illustrates a user interface displayed on the second electronic device according to various embodiments of the present disclosure.

FIG. 16 illustrates a user interface displayed on the second electronic device according to various embodiments of the present disclosure.

Referring to FIGS. 4 to 16, the second electronic device 402 or 602 may share data with the first electronic device 401 or 601 through a multi-locking function.

According to an embodiment, the second electronic device 402 or 602 may share data (DATA) through a user interface displayed on the display.

Referring to FIG. 16A, the second electronic device 402 or 602 may display an authentication identification window 1610. At this time, the authentication identification window 1610 may include an authentication information input window 1615 to which authentication information is input.

According to an embodiment, the second electronic device 402 or 602 may configure the second key (KEY2) for shared data (DATA) and transmit the second key (KEY2) to the first electronic device 401 or the server 610.

For example, the user of the first electronic device 401 or 601 may input a pattern as authentication information for the data (DATA). That is, the second key (KEY2) may be implemented as the input pattern.

Referring to FIG. 16B, the second electronic device 402 or 602 may receive data (DATA or LDAATA1) from the first electronic device 401 or 601 or the server 610. At this time, the second electronic device 402 or 602 may display the received data 1620. For example, the second electronic device 402 or 602 may display a received security file.

For example, the user of the second electronic device 402 or 602 may select the received security file and the second electronic device 402 or 602 may open the security file. At this time, the second electronic device 402 or 602 may transmit a generation signal of a first event for the data (DATA or LDATA1) to the first electronic device 401 or 601 or the server 610.

Referring to FIG. 16C, the second electronic device 402 or 602 may receive authentication information (for example, the second key (KEY2)) of the second electronic device for the data in order to execute the event of the data. Further, when the user of the first electronic device 401 or 601 selects accept icon in the authentication identification window 1510, the first electronic device 401 or 601 may receive authentication information (for example, the second key (KEY2)) for the data.

According to an embodiment, the second electronic device 402 or 602 may display an event approval window 1630 for approving the first event. For example, the event approval window 1630 may include an authentication information input window 1635 to which authentication information of the second electronic device 402 or 602 is input.

According to an embodiment, the user of the second electronic device 402 or 602 may input the second key (KEY2) for the data (DATA or LDATA1) to the authentication information window 1635.

For example, the user of the second electronic device 402 or 602 may input a pattern as the second key (KEY2) for the data (DATA or LDATA1).

When the second electronic device 402 receives the first key (KEY1) input to the first electronic device 401, the second electronic device 402 or 602 may execute the first event for the data through the first key (KEY1) and the second key (KEY2). Further, the second electronic device 402 or 602 may determine whether the input second key (KEY2) is the same as the configured second key (KEY2) and execute the first event according to the determination result (for example, when the second keys are the same as each other).

Meanwhile, the second electronic device 602 may transmit the input second key (KEY2) to the server 610. At this time, the server 610 may transmit the data (ATA) to the second electronic device 602 in response to the received second key (KEY2).

Each of the components of the electronic device according to the present disclosure may be implemented by one or more components and the name of the corresponding component may vary depending on a type of the electronic device. In various embodiments, the inspection apparatus may include at least one of the above-described elements. Some of the above-described elements may be omitted from the electronic device, or the inspection apparatus may further include additional elements. Further, some of the components of the electronic device according to the various embodiments of the present disclosure may be combined to form a single entity, and thus, may equivalently execute functions of the corresponding elements prior to the combination.

Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

The invention claimed is:

1. A method of operating a first electronic device, the method comprising:
   receiving a request for data stored in the first electronic device from a second electronic device;
   in response to receiving the request, obtaining a first key related to the data; wherein the obtaining of the first key comprises: configuring the first key for the data in response to the request;
   receiving a second key obtained by the second electronic device from the second electronic device;
   transmitting first data in which the data is locked using the first key and the second key, to the second electronic device; and
   in response to identifying that a first event for unlocking the first data has occurred at the second electronic device, transmitting the first key to the second electronic device based on
   whether the first event is approved by the first electronic device such that the second electronic device unlocks the first data using the first key and the second key.

2. The method of claim 1, further comprising:
   receiving a request for the data stored in the first electronic device from a third electronic device and receiving a third key obtained by the third electronic device from the third electronic device;
   transmitting second data in which the data is locked using the first key and the third key to the third electronic device; and
   in response to identifying that a second event for unlocking the second data has occurred at the third electronic device, transmitting the first key to the third electronic device based on whether the second event is approved by the first electronic device such that the third electronic device unlocks the first data using the first key and the third key.

3. The method of claim 1, wherein the transmitting of the first key to the second electronic device comprises determining identifying whether to approve the first event based on at least one of a time and a place in which the first event has occurred.

4. The method of claim 1, further comprising, when the first event is an event in which the second electronic device retransmits the first data to a fourth electronic device, transmitting the first key to the fourth electronic device based on whether a third event is approved by the first electronic device in response to identifying that the third event for unlocking the first data has occurred at the fourth electronic device.

5. The method of claim 4, wherein the transmitting of the first key to the fourth electronic device comprises identifying whether to approve the third event regardless of whether the third event is approved by the second electronic device.

6. The method of claim 4, wherein the transmitting of the first key to the fourth electronic device comprises identifying whether to approve the third event based on whether the third event is approved by the second electronic device.

7. The method of claim 1, wherein the first event includes at least one of opening, executing, transmitting, reading, storing, modifying, and sharing the first data.

8. An electronic device comprising:
a memory;
a communication module;
and a processor, configured to:
  receive, via the communication module, a request for data stored in the memory from a second electronic device,
  obtain a first key by related to the data,
  receive a second key obtained by the second electronic device from the second electronic device,
  transmitting, via the communication module, the first data in which the data is locked using the first key and the second key, to the second electronic device, and
  in response to identifying that a first event for unlocking the first data is received has occurred at the second electronic device, transmit, via the communication module, the first key to the second electronic device based on whether the first event is approved by the first electronic device such that the second electronic device unlocks the first data using the first key and the second key,
  wherein the processor is configured to configure the first key for the data in response to the request.

9. The electronic device of claim 8, wherein the processor is further configured to:
  receive a request for the data stored in the first electronic device from a third electronic device and receive a third key obtained by the third electronic device from the third electronic device,
  transmits second data in which the data is locked using the first key and the third key, to the third electronic device, and
  in response to identifying that a second event for unlocking the second data has occurred at the third electronic device, transmit the first key to the third electronic device based on whether the second event is approved by the first electronic device such that the third electronic device unlocks the first data using the first key and the third key.

10. The electronic device of claim 8, wherein the processor is configured to identify whether to approve the first event based on at least one of a time and place in which the first event has occurred.

11. The electronic device of claim 8, wherein the processor is further configured to: when the first event is an event in which the second electronic device retransmits the first data to a fourth electronic device, transmits the first key to the fourth electronic device based on whether a third event is approved by the first electronic device in response to identifying that the third event for unlocking the first data has occurred at the fourth electronic device.

12. The electronic device of claim 11, wherein the processor is configured to identify whether to approve the third event regardless of whether the third event is approved by the second electronic device.

13. The electronic device of claim 11, wherein the processor is configured to identify whether to approve the third event based on whether the third event is approved by the second electronic device.

* * * * *